US009310790B2

(12) United States Patent
Krishnaswamy et al.

(10) Patent No.: US 9,310,790 B2
(45) Date of Patent: Apr. 12, 2016

(54) LARGE-SCALE COMPREHENSIVE REAL-TIME MONITORING FRAMEWORK FOR INDUSTRIAL FACILITIES

(75) Inventors: Meenakshi Sundaram Krishnaswamy, Bangalore (IN); Venkata Naresh Kumar Boggarapu, Bangalore (IN); Srikanth Pothakamuri, Guntur (IN)

(73) Assignee: Honeywell International Inc., Morris Plains, NJ (US)

( * ) Notice: Subject to any disclaimer, the term of this patent is extended or adjusted under 35 U.S.C. 154(b) by 305 days.

(21) Appl. No.: 13/113,593

(22) Filed: May 23, 2011

(65) Prior Publication Data

US 2012/0303150 A1    Nov. 29, 2012

(51) Int. Cl.
*G06F 19/00*    (2011.01)
*G05B 17/02*    (2006.01)
*G05B 23/02*    (2006.01)

(52) U.S. Cl.
CPC ............ *G05B 17/02* (2013.01); *G05B 23/0251* (2013.01)

(58) Field of Classification Search
CPC ........................... G05B 17/02; G05B 23/0251
USPC ...................... 700/85, 90, 108, 110
See application file for complete search history.

(56) References Cited

U.S. PATENT DOCUMENTS

| | | |
|---|---|---|
| 4,885,707 A | 12/1989 | Nichol et al. |
| 5,262,958 A | 11/1993 | Chui et al. |
| 5,381,697 A | 1/1995 | van der Pol |
| 5,479,824 A | 1/1996 | Torres |
| 5,519,337 A | 5/1996 | Casada |
| 5,594,180 A | 1/1997 | Carpenter et al. |
| 5,616,824 A | 4/1997 | Abdel-Malek et al. |
| 5,641,891 A | 6/1997 | Frankl et al. |
| 5,646,600 A | 7/1997 | Abdel-Malek et al. |
| 5,750,879 A | 5/1998 | Ohtsuka et al. |

(Continued)

FOREIGN PATENT DOCUMENTS

| | | |
|---|---|---|
| EP | 1 097 363 B1 | 12/2007 |
| JP | 62226033 A | 10/1987 |

(Continued)

OTHER PUBLICATIONS

Laibin Zhang, et al., "Short-term fault prediction of mechanical rotating parts on the basis of fuzzy-grey optimising method", Mechanical Systems and Signal Processing 21 (2007), p. 856-865.
Michael J. Devaney, et al., "Detecting Motor Bearing Faults", IEEE Instrumentation & Measurements Magazine, Dec. 2004, p. 30-35 & 50.
Jason R. Stack, et al., "Fault Classification and Fault Signature Production for Rolling Element Bearings in Electric Machines", IEEE Transactions on Industry Applications, vol. 40, No. 3, May/Jun. 2004, p. 735-739.
Peter W. Tse, et al., "Wavelet Analysis and Envelope Detection for Rolling Element Bearing Fault Diagnosis—Their Effectiveness and Flexibilities", Journal of Vibration and Acoustics, Jul. 2001, vol. 123, p. 303-310.

(Continued)

*Primary Examiner* — Mohammad Ali
*Assistant Examiner* — Ziaul Karim

(57) ABSTRACT

A method includes associating multiple real-time applications with a framework. The real-time applications include applications for monitoring or controlling equipment in at least one industrial facility. Each application has at least one input variable and at least one output variable. The method also includes identifying relationships between the input and output variables of the applications to identify data dependencies. The method further includes receiving data updates at the framework and notifying at least one of the applications of the data updates based on the data dependencies to support data-driven operation of the framework. The data-driven operation of the framework provides data to the applications to support performance monitoring of the equipment, analysis of the equipment's operation, and/or identification of abnormal equipment conditions.

18 Claims, 19 Drawing Sheets

(56) References Cited

U.S. PATENT DOCUMENTS

| | | | |
|---|---|---|---|
| 5,966,674 A | 10/1999 | Crawford et al. | |
| 6,014,612 A * | 1/2000 | Larson et al. | 702/183 |
| 6,208,943 B1 | 3/2001 | Randolph et al. | |
| 6,266,726 B1 * | 7/2001 | Nixon et al. | 710/105 |
| 6,330,525 B1 * | 12/2001 | Hays et al. | 702/183 |
| 6,408,676 B1 | 6/2002 | Stratton et al. | |
| 6,411,987 B1 * | 6/2002 | Steger et al. | 709/203 |
| 6,484,109 B1 | 11/2002 | Lofall | |
| 6,501,995 B1 * | 12/2002 | Kinney et al. | 700/1 |
| 6,505,517 B1 | 1/2003 | Eryurek et al. | |
| 6,507,789 B1 | 1/2003 | Reddy et al. | |
| 6,539,315 B1 | 3/2003 | Adams et al. | |
| 6,654,697 B1 | 11/2003 | Eryurek et al. | |
| 6,681,634 B2 | 1/2004 | Sabini et al. | |
| 6,725,167 B2 | 4/2004 | Grumstrup et al. | |
| 6,727,725 B2 | 4/2004 | Devaney et al. | |
| 6,757,668 B1 | 6/2004 | Goebel et al. | |
| 6,839,660 B2 * | 1/2005 | Eryurek et al. | 702/188 |
| 6,933,693 B2 | 8/2005 | Schuchmann | |
| 6,941,785 B2 | 9/2005 | Haynes et al. | |
| 7,257,501 B2 | 8/2007 | Zhan et al. | |
| 7,272,815 B1 * | 9/2007 | Eldridge et al. | 717/101 |
| 7,274,995 B2 | 9/2007 | Zhan et al. | |
| 7,286,945 B2 | 10/2007 | Zhan et al. | |
| 7,421,374 B2 | 9/2008 | Zhan et al. | |
| 7,424,403 B2 | 9/2008 | Robinson et al. | |
| 7,479,876 B2 | 1/2009 | Carle et al. | |
| 7,831,317 B2 * | 11/2010 | McGreevy et al. | 700/19 |
| 7,945,397 B2 | 5/2011 | Kar | |
| 7,966,150 B2 | 6/2011 | Smith et al. | |
| 8,898,660 B2 * | 11/2014 | Hieb et al. | 717/174 |
| 2002/0077711 A1 * | 6/2002 | Nixon | C10G 11/187 700/51 |
| 2003/0019297 A1 | 1/2003 | Fiebelkorn et al. | |
| 2003/0028268 A1 * | 2/2003 | Eryurek et al. | 700/73 |
| 2003/0139837 A1 * | 7/2003 | Marr | G05B 23/0278 700/110 |
| 2003/0216888 A1 | 11/2003 | Ridolfo | |
| 2004/0024568 A1 | 2/2004 | Eryurek et al. | |
| 2004/0034662 A1 * | 2/2004 | Austin et al. | 707/104.1 |
| 2004/0122940 A1 * | 6/2004 | Gibson et al. | 709/224 |
| 2004/0159112 A1 | 8/2004 | Jayanth et al. | |
| 2005/0104020 A1 | 5/2005 | Zhan et al. | |
| 2006/0025970 A1 | 2/2006 | Wegerich | |
| 2006/0071666 A1 | 4/2006 | Unsworth et al. | |
| 2006/0259634 A1 * | 11/2006 | Hood et al. | 709/230 |
| 2007/0088534 A1 | 4/2007 | MacArthur et al. | |
| 2007/0109301 A1 | 5/2007 | Smith | |
| 2008/0168356 A1 * | 7/2008 | Eryurek et al. | 715/736 |
| 2009/0045940 A1 | 2/2009 | Sadana | |
| 2010/0030492 A1 | 2/2010 | Kar et al. | |
| 2010/0062735 A1 | 3/2010 | Sadana | |
| 2010/0153771 A1 * | 6/2010 | Gordon et al. | 714/4 |
| 2010/0161132 A1 | 6/2010 | Bharati et al. | |
| 2010/0169030 A1 * | 7/2010 | Parlos | 702/58 |
| 2010/0256932 A1 | 10/2010 | Kar | |
| 2010/0256953 A1 | 10/2010 | Kar | |
| 2012/0016607 A1 * | 1/2012 | Cottrell | G05B 23/0229 702/62 |

FOREIGN PATENT DOCUMENTS

| | | |
|---|---|---|
| JP | 07-43278 B2 | 5/1995 |
| JP | 07-306820 A | 11/1995 |
| JP | 2005147081 A | 6/2005 |
| JP | 2005-218267 A | 8/2005 |
| KR | 10-2003-0042593 A | 6/2003 |
| KR | 10-0867864 B1 | 11/2008 |
| WO | WO 03/090091 A1 | 10/2003 |
| WO | WO 2007/061840 A2 | 5/2007 |

OTHER PUBLICATIONS

V. Sugumaran, et al., "Automatic rule learning using decision tree for fuzzy classifier in fault diagnosis of roller bearing", Mechanical Systems and Signal Processing 21 (2007), p. 2237-2247.

Yaguo Lei, et al., "Fault diagnosis of rotating machinery based on multiple ANFIS combination with GA s", Mechanical Systems and Signal Processing 21 (2007), p. 2280-2294.

Jason R. Stack, et al., "An Amplitude Modulation Detector for Fault Diagnosis in Rolling Element Bearings", IEEE Transactions on Industrial Electronics, vol. 51, No. 5, Oct. 2004, p. 1097-1102.

Robert B. Randall, "State of the Art in Monitoring Rotating Machinery—Part 1", Sound and Vibration, Mar. 2004, p. 14-20.

Z.K. Peng, et al., "A comparison study of improved Hilbert-Huang transform and wavelet transform: Application to Fault disgnosis for rolling bearing", Mechanical Systems and Signal Processing 19 (2005), p. 974-988.

Xinsheng Lou, et al., "Bearing fault diagnosis based on wavelet transform and fuzzy inference", Mechanical Systems and Signal Processing 18 (2004) p. 1077-1095.

T.I. Liu, et al., "Detection of Roller Bearing Defects Using Expert System and Fuzzy Logic", Mechanical Systems and Signal Processing (1996) 10(5), p. 595-614.

Yaguo Lei, et al., "A new approach to intelligent fault diagnosis of rotating machinery", Expert Systems with Applictaions 35 (2008), p. 1593-1600.

Paula J. Dempsey, et al., "Tapered Roller Bearing Damage Detection Using Decision Fusion Analysis", NASA/TM-2006-214380, Jul. 2006, 23 pages.

A.R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.

Chinmaya Kar, et al., "Vibration and current transient monitoring for gearbox fault detection using multiresolution Fourier transform", Journal of Sound and Vibration 311 (2008), p. 109-132.

Chinmaya Kar, et al., "Monitoring gear vibrations through motor current signature analysis and wavelet transform", Mechanical Systems and Signal Processing 20 (2006), p. 158-187.

T. Lindth et al., "Automatic bearing fault classification combining statistical classification and fuzzy logic", 4th Nordic Workshop in Power & Industrial Electronics, Jun. 2004, 5 pages.

Tom Kevan, "Shipboard Machine Monitoring for Predictive Maintenance," Sensors, Feb. 1, 2006, 5 pages.

VMD Jagannath et al., "WiBeaM: Wireless Bearing Monitoring System" Communication Systems Software and Middleware, IEEE, Jan. 2007, p. 1-8.

International Search Report dated Dec. 9, 2010 in connection with International Patnt Application No. PCT/US2010/028258.

Simon G. Braun, "The Signature Analysis of Sonic Bearing Vibrations", IEEE Transactions on Sonics and Ultrasonics, vol. SU-27, No. 6, Nov. 1980, pp. 317-327.

Y. Gao et al., "Wavelet-Based Pressure Analysis for Hydraulic Pump Health Diagnosis", Transactions of the ASAE, vol. 46(4), pp. 969-976.

Horch A, "A Simple Method for Detection of Stiction in Control Valves", Control Engineering Practice, Pergamon Press, Oxford, GB, vol. 7, 1999, pp. 1221-1231.

Jiang Wanlu et al., "Applying Multiresolution Analysis for Processing of Hydraulic Pump Fault Signal", Fifth International Conference on Fluid Power Transmission and Control, Hangzhou, China, Apr. 2001, pp. 1-5.

Fujun He et al. "WPT-SVMs Based Approach for Fault Detection of Valves in Reciprocating Pumps", Proceedings of the American Control Conference, Anchorage, AK, May 8-10, 2002, pp. 4566-4570.

Mallat et al., "Singularity Detection and Processing with Wavelets", Mar. 1992, IEEE Transactions on Information Theory, vol. 38, No. 2, pp. 617-643.

Wang et al., "The Fault Character of the Motors Identified Based on Wavelet Transform", Nov. 2-5, 2003, Proceedings of the Second International Conference on Machine Learning and Cybernetics, Xi'an, pp. 2394-2398.

Gao et al., "Support Vector Machines Based Apprroach for Fault Diagnosis of Valves in Reciprocating Pumps", 2002 IEEE Canadian Conference, pp. 1622-1627.

Ren et al., "Fault Feature Extracting by Wavelet Transform for Control System Fault Detection and Diagnosis", 2000 IEEE, International Conference on Control Applications, pp. 485-489.

(56) References Cited

OTHER PUBLICATIONS

International Search Report for PCT/US2004/038766, issued by the International Searching Authority, mailed Apr. 14, 2005, by the European Patent Office, P.B. 5818 Patentlaan 2, NL-2280 HV Rijswijk.
Parvez S. et al., "A Wavelet-Based Multi-Resolution PID Controller", 2003 IEEE Conference, Salt Lake City, UT, Oct. 2003, vol. 3 of 3, Conf. 38, pp. 1-5.
Zhihan Xu et al., "Design of-Fault Detection and Isolation Via Wavelet Analysis and Neural Network", 2002 IEEE International Symposium, Vancouver, Canada, Oct. 2002, pp. 467-472.
Song Zhihuan et al., "Adaptive Predictive Control Based on Wavelet Approximation Models", IEEE Conference, Beijing China, Oct. 1996, vol. 2, pp. 820-824.
Xiaohua Xia et al., "Nonlinear Adaptive Predictive Control Based on Orthogonal Wavelet Networks", Shanghai China, Jun. 2002, vol. 1, pp. 305-311.
Nounou M. N. et al., "Multiscale Fuzzy System Identification", Journal of Process Control, Oxford, GB, vol. 15, No. 7, Oct. 2005, pp. 763-770.
Billings S. A. et al., "Discrete Wavelet Models for Identification and Qualitative Analysis of Chaotic Systems", International Journal of Bifurcation and Chaos, vol. 9, No. 7, Jul. 1999, pp. 1263-1284.
A. R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.
Chinmaya Kar, et al., "Monitoring gear vibrations through motor current signature analysis and wavelet transform", Mechanical System and Signal Processing 20 (2006), p. 158-187.
Written Opinion of the International Searching Authority dated Dec. 9, 2010 in connection with International Patnt Application No. PCT/US2010/028258.
Lathi, B. P., "Linear Systems and Signals", 1992, Berkeley-Cambridge Press, p. 574-580.
Carl S. Byington, P.E., et al., "In-Line Health Monitoring System for Hydraulic Pumps and Motors", 2003 IEEE, 9 pages.
Kai F. Goebel, "Conflict Resolution Using Strengthening and Weakening Operations in Decision Fusion", Proceedings of the 4th Annual Conference on Information Fusion, Fusion 2001, pp. ThA1-19-ThA1-25, 2001.
Sanket Amin, et al., "Fuzzy Inference and Fusion for Health State Diagnosis of Hydraulic Pumps and Motors", AFDDPS-NAFIPS, Jun. 2005, 6 pages.
Chinmaya Kar, et al., "System and Method for Conflict Resolution to Support Simultaneous Monitoring of Multiple Subsystems", U.S. Appl. No. 12/797,472, filed Jun. 9, 2010.
Notification of Transmittal of the International Search Report and the Written Opinion of the International Searching Authority, or the Declaration dated Nov. 26, 2012 in connection with International Patent Application No. PCT/US2012/036713.
Communication dated Mar. 23, 2015 in connection with European Patent Application No. 12789130.7; 3 pages.
Communication Pursuant to Article 94(3) EPC dated Apr. 9, 2015 in connection with European Patent Application 12789130.7; 8 pages.

* cited by examiner

| Asset Management | | | | Welcome: John | | | Honeywell |
|---|---|---|---|---|---|---|---|
| Home | Configuration | Monitor | Analyze | | Setting | Help | Signout |
| Assets | External Interface | Administration | Asset Type ←1104 | | | | |

View [Default ▼] — □ ✕   Model

◢ Hierarchy
   Computer
   Impeller
   Drill equipment
   Reactor
   Fire and Gas Detector
◢ Data Source
◢ Compressor
   Sliding Vane
   Blower
   Centrifugal – 1 Case
   Reciprocating
  Shell and Tube
  Screw Type

1106

[+] [–] [Save]

◢ Associated Model
◢ Performance
   Variable
◢ Calculations
   Measured Head
   Polytropical Efficiency
   Power
◢ Logics
   Poor Operation
   Low Suction Temperature

1110

Different Views ▼

← 1108

| Name | Description | Data Type | Units | Default value |
|---|---|---|---|---|
| ▲ Cold:Tin | Variable Description | | | 0 |
| Cold:Tout | Variable Description | | | 0 |
| DPHighLimit | Variable Description | | | 0 |
| Hin | Variable Description | | | 0 |
| Hot:Tin | OutletTemperature | | | 0 |
| Hot:Tout | Variable Description | | | 0 |
| Hot:Tout:LowLimit | Variable Description | | | 0 |
| Hout | Variable Description | | | 0 |
| MassFlow | Variable Description | | | 0 |
| MTD | OutletTemperature | | | 0 |
| OutletTemp | OutletTemperature | | | 0 |
| Pin | Variable Description | | | 0 |
| Pout | Variable Description | | | 0 |
| UA | Variable Description | | | 0 |

LARGE-SCALE COMPREHENSIVE REAL-TIME MONITORING FRAMEWORK FOR INDUSTRIAL FACILITIES

TECHNICAL FIELD

This disclosure relates generally to control systems. More specifically, this disclosure relates to a large-scale comprehensive real-time monitoring framework for industrial facilities.

BACKGROUND

Processing facilities are typically managed using process control systems. Example processing facilities include manufacturing plants, chemical plants, crude oil refineries, and ore processing plants. Among other things, process control systems often manage the use of industrial equipment in the processing facilities.

Various process industries have seen constant growth in automation technology. However, it is often challenging to integrate native and custom application components into a single control system. This can be due to a number of factors, such as difficulty in maintaining a sequence of calculations or rules to be evaluated during the control of a processing facility. This becomes even more problematic when dealing with a large number of applications having an even larger number of calculations or rules.

SUMMARY

This disclosure provides a large-scale comprehensive real-time monitoring framework for industrial facilities.

In a first embodiment, a method includes associating multiple real-time applications with a framework. The real-time applications include applications for monitoring or controlling equipment in at least one industrial facility. Each application has at least one input variable and at least one output variable. The method also includes identifying relationships between the input and output variables of the applications to identify data dependencies. The method further includes receiving data updates at the framework and notifying at least one of the applications of the data updates based on the data dependencies to support data-driven operation of the framework. The data-driven operation of the framework provides data to the applications to support performance monitoring of the equipment, analysis of the equipment's operation, and/or identification of abnormal equipment conditions.

In a second embodiment, a computer readable medium embodies a computer program. The computer program includes computer readable program code for identifying relationships between input and output variables of multiple real-time applications associated with a framework to identify data dependencies. The applications include applications for monitoring or controlling equipment in at least one industrial facility. Each application has at least one input variable and at least one output variable. The computer program also includes computer readable program code for receiving data updates at the framework and notifying at least one of the applications of the data updates based on the data dependencies to support data-driven operation of the framework. The data-driven operation of the framework is configured to provide data to the applications to support performance monitoring of the equipment, analysis of the equipment's operation, and/or identification of abnormal equipment conditions.

In a third embodiment, a system includes at least one interface configured to receive data associated with equipment in at least one industrial facility. The system also includes at least one processing unit configured to identify relationships between input and output variables of multiple real-time applications associated with a framework to identify data dependencies. The real-time applications include applications for monitoring or controlling the equipment. Each application has at least one input variable and at least one output variable. The at least one processing unit is also configured to receive data updates at the framework and notify at least one of the applications of the data updates based on the data dependencies to support data-driven operation of the framework. The data-driven operation of the framework is configured to provide the data to the applications to support performance monitoring of the equipment, analysis of the equipment's operation, and/or identification of abnormal equipment conditions.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 9 through 19 illustrate details of an example asset manager that uses a large-scale framework according to this disclosure.

DETAILED DESCRIPTION

FIGS. 1 through 19, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
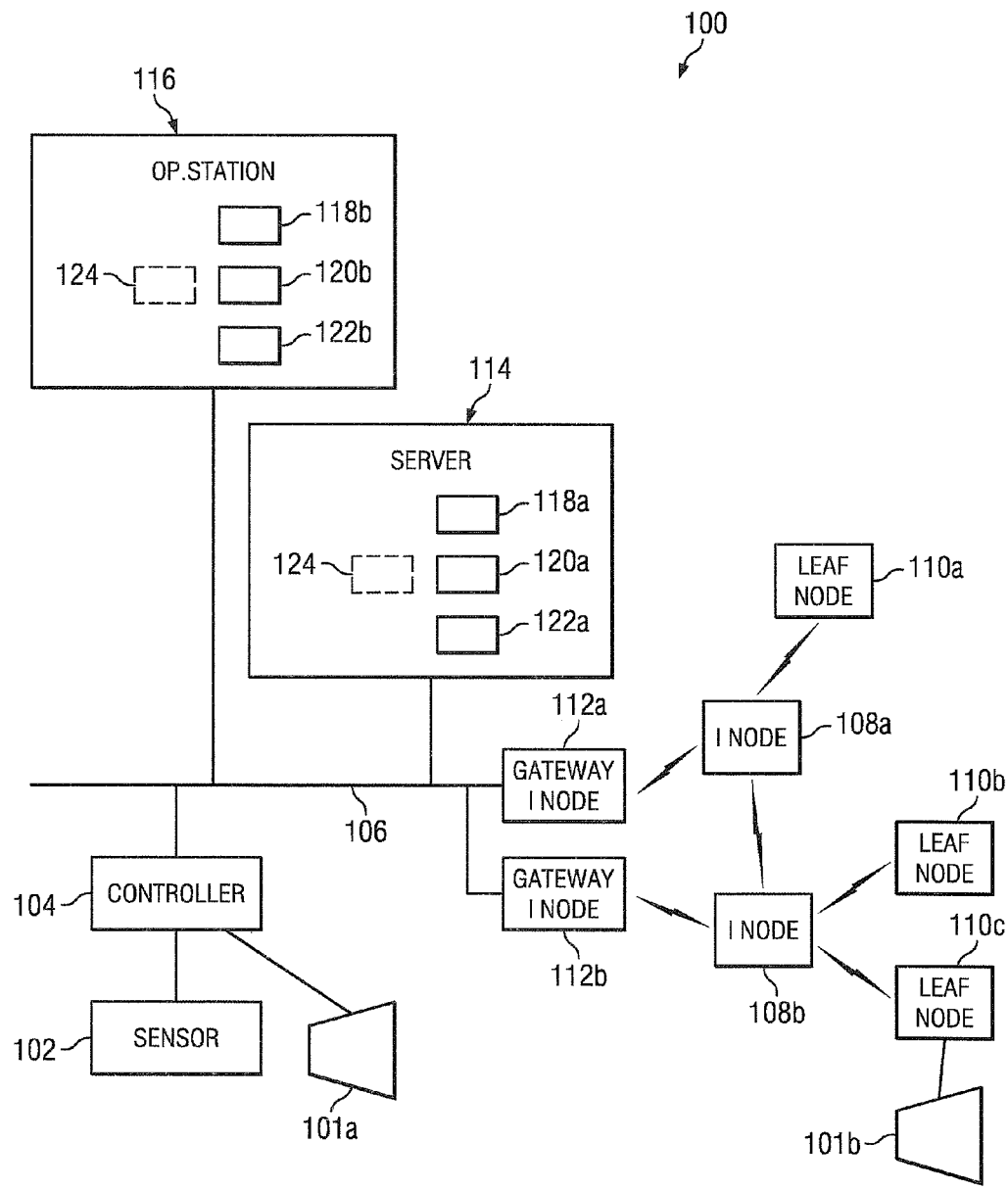
FIG. 1 illustrates an example process control system providing a large-scale comprehensive real-time monitoring framework for an industrial facility according to this disclosure.

FIG. 1 illustrates an example process control system 100 providing a large-scale comprehensive real-time monitoring framework for an industrial facility according to this disclosure. As shown in FIG. 1, the system 100 includes one or more pieces of industrial equipment 101a-101b. The industrial equipment 101a-101b represents any suitable equipment used in a process system. The industrial equipment 101a-101b could, for instance, include pumps or other equipment having rotating components (like gears, impellers, shafts, bearings, motors, or rotors). Any other or additional industrial equipment could be used in or with the process control system 100. Also, a process system may represent any system or portion thereof configured to produce or process one or more materials in some manner.

One or more sensors 102 measure at least one characteristic of the process system. For example, a sensor 102 could measure vibrations of a pump or other equipment having a rotating component. A sensor 102 could measure any other or additional characteristic(s), such as temperature, pressure, material composition, or flow rate. Each sensor 102 includes any suitable structure for measuring one or more characteristics associated with a process system.

One or more controllers 104 receive data from the sensors 102 and use the data to control the industrial equipment 101a. For example, a controller 104 could use the sensor measurements to alter a speed or other operational property of the equipment 101a or identify problems with the equipment 101a. Each controller 104 includes any suitable structure for controlling industrial equipment.

One or more networks 106 support communications between other components in the system 100. For example, a network 106 may communicate Internet Protocol (IP) packets, frame relay frames, Asynchronous Transfer Mode (ATM) cells, or other suitable information between network addresses. Each network 106 may include one or more local area networks, metropolitan area networks, wide area networks (WANs), all or a portion of a global network, or any other communication system or systems at one or more locations.

The process control system 100 also includes one or more wireless networks. In this example, a wireless network includes infrastructure nodes ("I-nodes") 108a-108b, leaf nodes 110a-110c, and gateway I-nodes 112a-112b. The I-nodes 108a-108b and 112a-112b represent wireless nodes capable of providing wireless coverage in a specified area, such as a large industrial complex. The I-nodes 108a-108b are typically routing devices that receive and forward data wirelessly. The gateway I-nodes 112a-112b provide the additional ability to communicate over a wired network, such as the network 106. The leaf nodes 110a-110c generally represent endpoints that communicate over the wireless network formed by the I-nodes. Each of the nodes 108a-108b, 110a-110c, 112a-112b could use any suitable communication technique, such as radio frequency (RF) frequency-hopping spread spectrum (FHSS) or direct sequence spread spectrum (DSSS) techniques. Each of the nodes 108a-108b, 110a-110c, 112a-112b could also include other functionality, such as functionality for generating or using data communicated over the wireless network. For instance, the leaf nodes 110a-110c may represent wireless sensors measuring one or more characteristics of the industrial equipment 101b, which can be controlled by the controller 104 or a wireless controller.

One or more servers 114 can perform various functions in the process control system 100. For example, a server 114 could provide wireless network management and security functions. One or more operator stations 116 allow users to interact with the servers 114 and other components of the system 100. An operator station 116 could, for example, receive and display alarm messages or allow users to modify control algorithms used by the servers and controllers. Each server 114 or operator station 116 includes any suitable structure for performing the desired function(s). For example, a server 114 or operator station 116 could include at least one processing device 118a-118b, such as a processor, microprocessor, microcontroller, field programmable gate array (FPGA), or other processing or control device. A server 114 or operator station 116 could also include at least one memory 120a-120b storing instructions and data used, generated, or collected by the processing device(s). A server 114 or operator station 116 could further include at least one interface 122a-122b for communicating with external devices and systems, such as a wired interface or a wireless transceiver.

In this example, a single network 106 is shown coupled to a server 114 and an operator station 116. However, these components could be replicated any number of times on any number of levels. In particular embodiments, the control system 100 supports the Purdue model of process control and includes multiple computing levels, each level controlling the level below it (if any).

In one aspect of operation, the servers 114 and/or operator stations 116 execute one or more applications or otherwise provide functionality supporting a large-scale comprehensive real-time monitoring framework 124 for the process system. The framework 124 supports the integration of multiple native and custom application components while maintaining sequences of calculations, rules, and/or programs to be evaluated during control operations. The framework 124 also provides tools to capture expert or experienced operator/technician knowledge for download to an execution environment in suitable format. The framework 124 can provide key process indicator (KPI) integration to operators' consoles, handle large amounts of data, and leverage the use of multi-core central processing units.

Depending on the implementation, the framework 124 could support any combination of the following features:
 an optimized data-driven approach for handling data dependencies, where updates to data trigger updates to components that use the data;
 sequential processing of custom rules and calculations and the use of distinct embedded and custom processing engines to support data dependencies;
 a scalable open interface;
 distributed data, processing, and presentation in a location-transparent or location-insensitive manner;
 data integrity maintenance;
 dynamic recovery of a communication interface;
 parallelization of independent processing tasks and loops;
 notification of any system failures to improve application reliability; and
 display of hierarchical health or fault tree of framework components, processing engines, data, or event interfaces.
The framework can help to fulfill the needs of real-time data processing and managing process industries beyond that often achieved using standard distributed control systems.

Additional details regarding the framework 124 are provided below. The framework 124 could be implemented in any suitable manner, such as by one or more computing devices executing software routines. However, the framework 124 could be implemented in any other suitable manner.

Although FIG. 1 illustrates one example of a process control system 100 providing a large-scale comprehensive real-time monitoring framework 124 for an industrial facility, various changes may be made to FIG. 1. For example, the system 100 could include any number of industrial equipment, sensors, controllers, networks (wired or wireless), I-nodes (gateway or other), leaf nodes, servers, and operator stations. Also, the functional division shown in FIG. 1 is for illustration only. Various components in FIG. 1 could be combined, subdivided, or omitted and additional components could be added according to particular needs. In addition, FIG. 1 illustrates one example operational environment where the framework 124 can be used. The framework 124 could be used in any other suitable system.

Figure 2A:
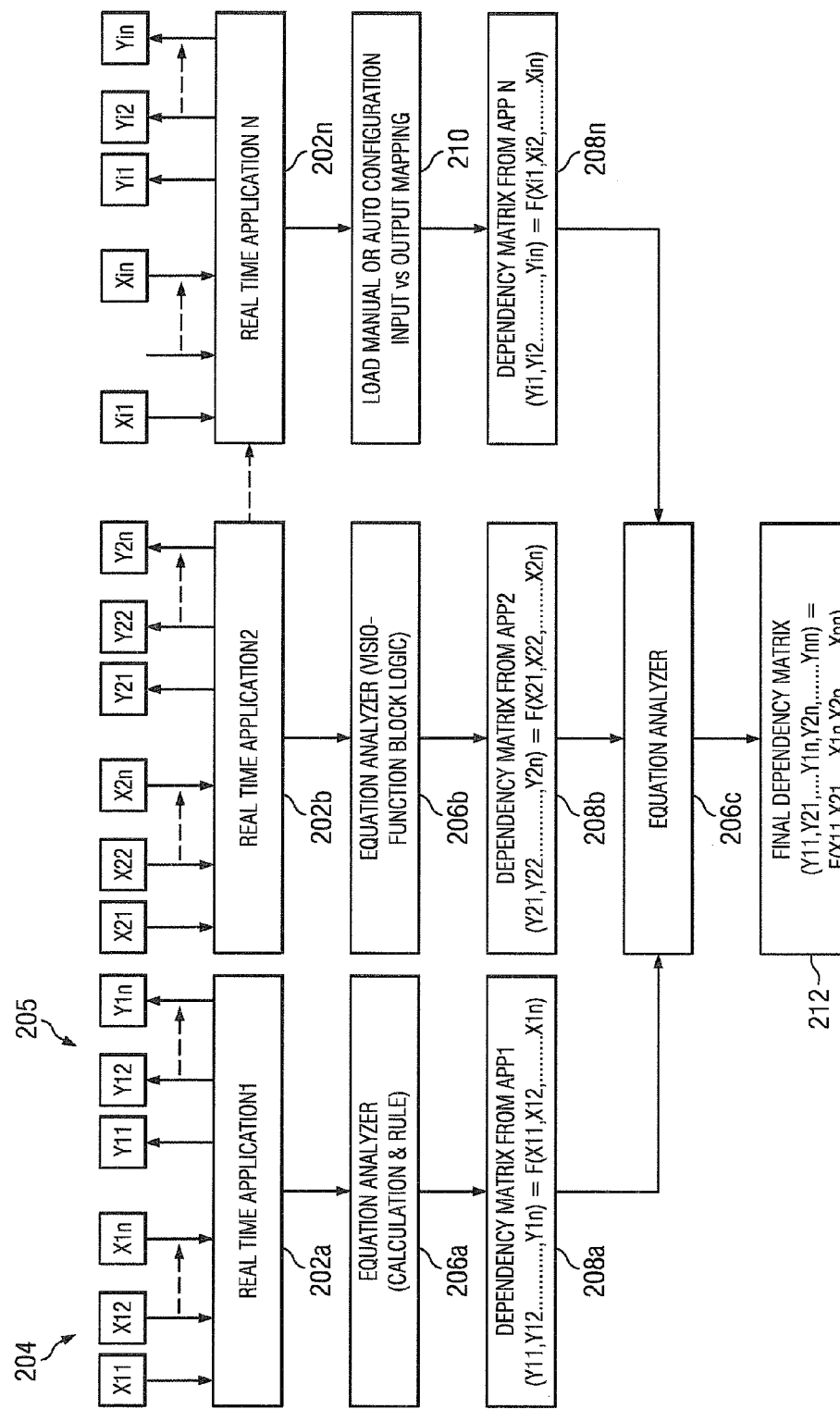
FIGS. 2A through 2C illustrate an example equation analyzer for a large-scale framework and related details according to this disclosure.
Figure 2B:
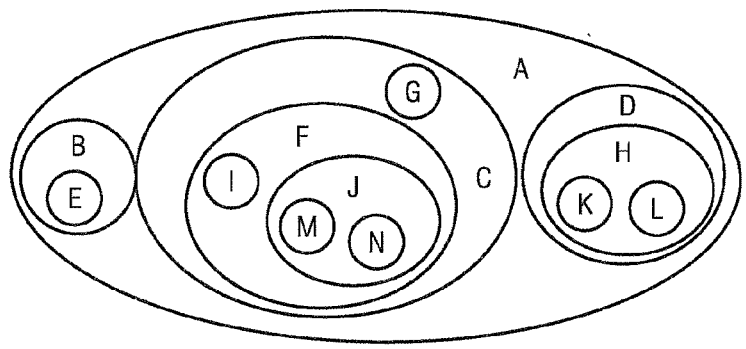
Figure 2C:
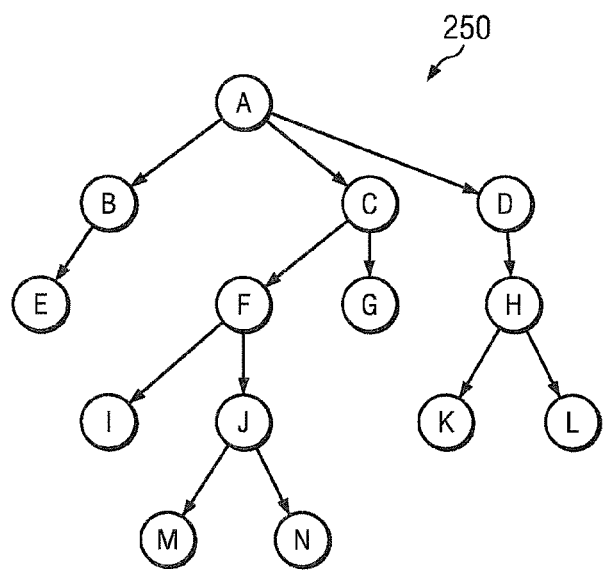

FIGS. 2A through 2C illustrate an example equation analyzer for the large-scale framework 124 and related details according to this disclosure. As noted above, the framework 124 integrates both native and custom application components, which could implement multiple distinct engines or other programs that operate in distinctly different ways. Example applications can include calculation or procedural programs, function block programs, and MICROSOFT EXCEL, HONEYWELL UNISIM DESIGN, or other external applications.

The framework 124 supports the use of different types of applications using a data-driven approach, which helps to ensure that functions or expressions dependent on a particular input variable are updated in response to a change in that input variable. This technique helps to provide correct output variable values for any change in a set of input variables. One challenge of a data-driven approach is to determine the relationships between data variables ahead of time.

The framework 124 therefore supports the use of an equation analyzer to determine variable dependencies. A variable dependency indicates that an output variable is dependent on one or more input variables. The equation analyzer therefore identifies independent and dependent variables. An independent variable denotes a variable whose value does not depend on another variable. A dependent variable denotes a variable whose value depends on at least one other variable.

As shown in FIG. 2A, the framework 124 is associated with a number of real-time or other applications 202a-202n. As noted above, the applications 202a-202n could represent distinctly different engines or other programs. Each application 202a-202n is associated with a set of input variables 204 and a set of output variables 205. One or more output variables 205 from one application 202a-202n can be provided as input variables 204 to other applications 202a-202n. The equation analyzer identifies relationships between these input and output variables 204-205. The data-driven framework 124 uses these relationships to ensure that changes to input data are accurately provided to components in order to update output data.

In this example, the equation analyzer includes three functional units 206a-206c. The functional unit 206a uses calculations and rules to identify the relationships between the input and output variables 204-205 of the application 202a. The calculations and rules could support any suitable logic. For instance, the functional unit 206a could use the calculations and rules to make changes to input variables 204 and identify which output variables 205 change. The functional unit 206a generates a dependency matrix 208a that identifies which input variables 204 affect each output variable 205 for the application 202a.

The functional unit 206b uses MICROSOFT VISIO drawings or other graphical function blocks to identify the relationships between the input and output variables 204-205 of the application 202b. In some embodiments, MICROSOFT VISIO drawings can be used to define the logic of an application, such as in the URT platform for the HONEYWELL ADVANCED PROCESS CONTROLLER. The functional unit 206b identifies a dependency matrix 208b for the application 202b using the MICROSOFT VISIO drawings or other function blocks. Again, the dependency matrix 208b identifies which input variables 204 affect each output variable 205 for the application 202b.

In FIG. 2A, a dependency matrix 208n is created for an application 202n using a loading mechanism 210. The loading mechanism 210 allows a user to manually load the dependency matrix 208n for the application 202n. This may be necessary if the equation analyzer is unable to analyze the application 202n.

The functional unit 206c of the equation analyzer uses the dependency matrices 208a-208n to construct a final dependency matrix 212. The final dependency matrix 212 identifies all of the input and output variables 204-205 for all of the applications 202a-202n. The final dependency matrix 212 also identifies all of the relationships between these input and output variables.

Each functional unit 206a-206b of the equation analyzer includes any suitable hardware, software, firmware, or combination thereof for identifying relationships between input and output variables of an application. The functional unit 206c of the equation analyzer includes any suitable hardware, software, firmware, or combination thereof for identifying relationships between input and output variables of multiple applications.

FIGS. 2B and 2C illustrate example operations of the equation analyzer. In FIG. 2B, different variables are denoted with the letters A through N. Each variable is contained within a circle or ellipse representing a particular owner or domain. An owner or domain could be a native application or a custom external application, such as a UNISIM DESIGN or EXCEL engine. The variables could be associated with the same owner or domain, or different variables could be associated with different owners or domains. Smaller variables encompassed within larger variables indicate that the smaller variables depend on the larger variables. For instance, variables B, C, and D are dependent on variable A, and variable E is dependent on variable B. A change in variable A therefore updates variables B, C, and D, which in turn updates variable E.

The equation analyzer analyzes the applications 202a-202n containing the variables in FIG. 2B and generates a hierarchy 250 shown in FIG. 2C. The hierarchy 250 shows the order of dependency of the variables. The hierarchy 250 defines publisher-subscriber relationships in the data-driven framework 124. A publisher denotes an entity outputting data for use by at least one subscriber. In this case, for instance, the owner or domain of variable A acts as a publisher for the owners or domains of variables B, C, and D.

The depth or number of levels of dependency identified by the equation analyzer in the hierarchy 250 can be limited and configurable by a user. Also, nested expressions can be identified by the equation analyzer, either during configuration or during run time.

Although FIGS. 2A through 2C illustrate one example of an equation analyzer for the large-scale framework 124 and related details, various changes may be made to FIGS. 2A through 2C. For example, the various functional units 206a-206c forming the equation analyzer could be combined or further subdivided, and other or additional functional units could be added (such as functional units that identify variables' relationships in other ways). Also, the contents of FIGS. 2B and 2C are for illustration only.

Figure 3:
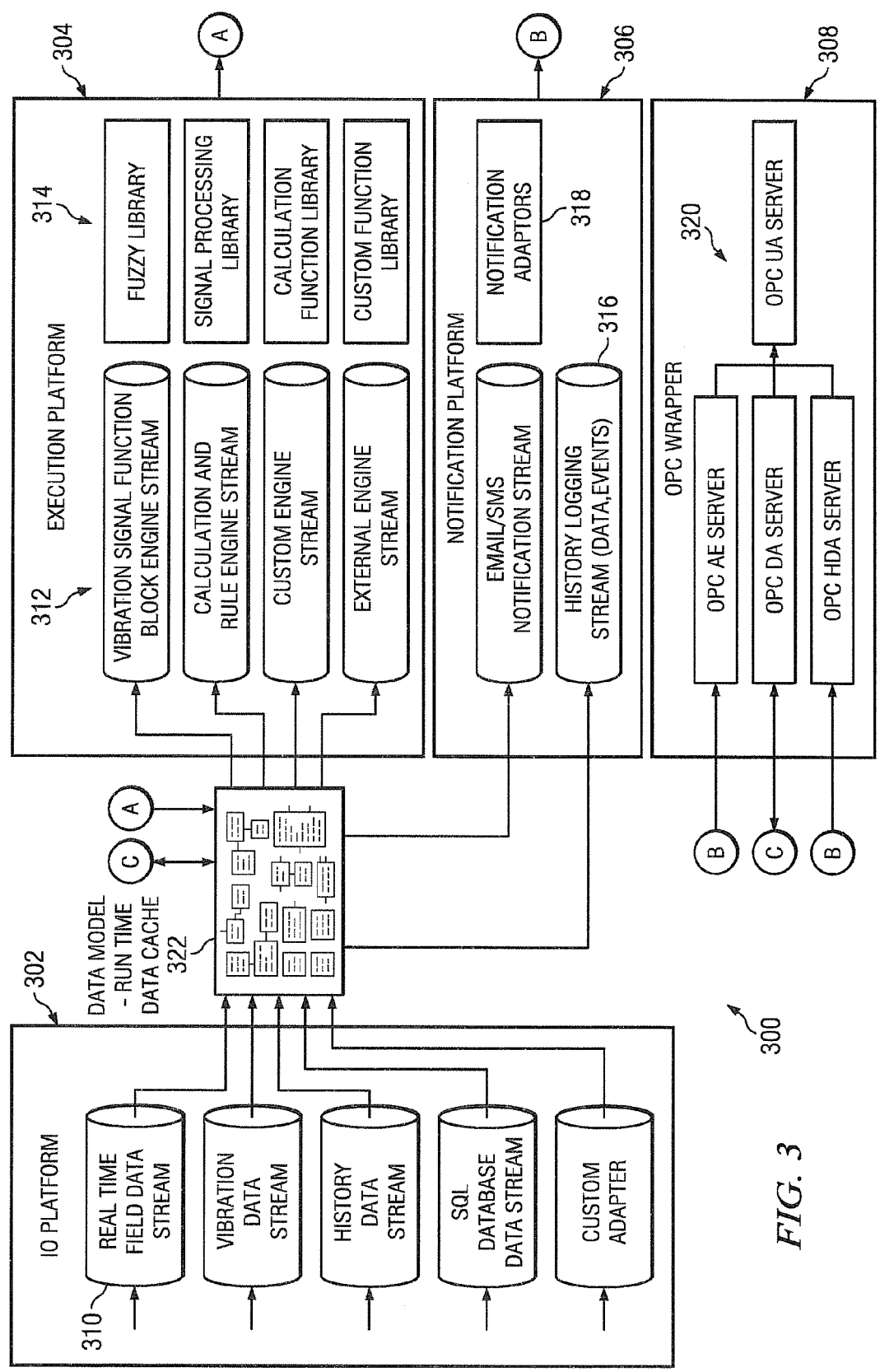
FIG. 3 illustrates an example data-driven architecture for a large-scale framework according to this disclosure.

FIG. 3 illustrates an example data-driven architecture 300 for the large-scale framework 124 according to this disclosure. Once data dependencies are identified by the equation analyzer as described above, the framework 124 uses the data dependencies to support data-driven operations. In these data-driven operations, a change to a variable can be published to any subscriber identified by the equation analyzer for that variable.

In FIG. 3, the architecture 300 is divided into four general platforms 302-308. An input/output (IO) platform 302 represents components used to receive incoming data and defines multiple data streams 310. Each stream 310 can be associated with a different type of data. In this example, the streams 310 contain real-time field data, vibration data, historical data, data from an SQL or other database, and data from a custom adapter. Note that any other or additional data streams could be used here. Also, the incoming data could be received from any suitable source(s), such as from sensors or applications 202a-202n.

An execution platform 304 executes applications 202a-202n supported by the framework 124. The execution platform 304 provides data to the applications 202a-202n in various data streams 312, and certain functions can be invoked within the execution platform 304 using one or more libraries 314. In this example, the data streams 312 contain data for a vibration signal and function block engine, a calculation and rule engine, a custom engine, and an external engine. The libraries 314 include a fuzzy logic library, a vibration domain/signal processing function library, a calculation function library, and a custom function library. Note that any other or additional data streams or libraries could be used here.

A notification platform 306 sends notifications, such as email or SMS messages, to operators or other personnel. In this example, the notification platform 306 includes data streams 316 and notification adapters 318. The streams 316 provide different types of data, such as email, SMS, or historical data. The notification adapters 318 generate suitable messages, such as email or SMS messages, containing the data. Note that any other or additional data streams, adaptors, and notification mechanisms could be used here.

An OLE for Process Control (OPC) platform 308 supports various OPC servers that act as application programming interfaces (APIs) or other interfaces for interacting with various components in the architecture. In this example, the OPC platform 308 includes servers 320 that support different OPC standards, including the OPC alarms and events (AE), data access (DA), historical data access (HDA), and unified architecture (UA) specifications. Note that any other or additional OPC or other servers could be used here.

As shown in FIG. 3, each platform 302-306 includes a number of different data streams. The data streams in each platform 302-306 can be managed by a thread pool and monitored by that platform 302-306.

A data cache 322 stores data and messages being transported between platforms in real-time. When the data cache 322 receives data, the data cache 322 can notify the appropriate application(s) that updated data has been received. The appropriate application(s) can be identified using the data dependencies identified by the equation analyzer. The notifications can be performed by a real-time data service and made to any subscribers that have subscribed to a particular data variable. In particular embodiments, publisher calls to a subscriber can be consolidated before sending a message to that subscriber, which reduces the number of calls made. The data cache 322 includes any suitable structure for storing and retrieving data transported between platforms. The data cache 322 could hold data in an address format defined by a data model configured by a user for the framework 124, allowing structured data storage. Embedded and custom applications 202a-202n can be inserted into the framework 124 and operate using the data model defined for that application.

The architecture 300 can provide various additional functions to support the framework 124. For example, the execution platform 304 can support the accurate reporting of data and a mechanism to propagate a data quality through the hierarchy 250 of variables. For example, assume that a pump's net positive suction head (NPSH) calculation uses a suction pressure, a vapor pressure, and a density of a fluid. The absence of any one of these input variables can invalidate an NPSH value, as well as the pump's health index value (which can be calculated using the NPSH value). The execution platform 304 can propagate the quality of the three input variables up to the NPSH value and the pump's health index value.

As another example, the architecture 300 can use consistent timestamps across related data variables. For example, the latest timestamp of data for an independent variable can be propagated through to any dependent variables dependent on that independent variable, even if the dependent variable values do not change. This helps to retain the latest timestamps for data in the hierarchy 250.

As still other examples, basic loops can be parallelized whenever possible to leverage the use of multiple processing units. Also, the platforms can be robust and integrate various I/O sources with higher throughput (such as on the order of 10,000 data values per second or more). In addition, real-time streaming of data and messages can improve the latency of data, and independent streaming of various data sources can be used to collect, validate, and update runtime data and message.

Figure 4:
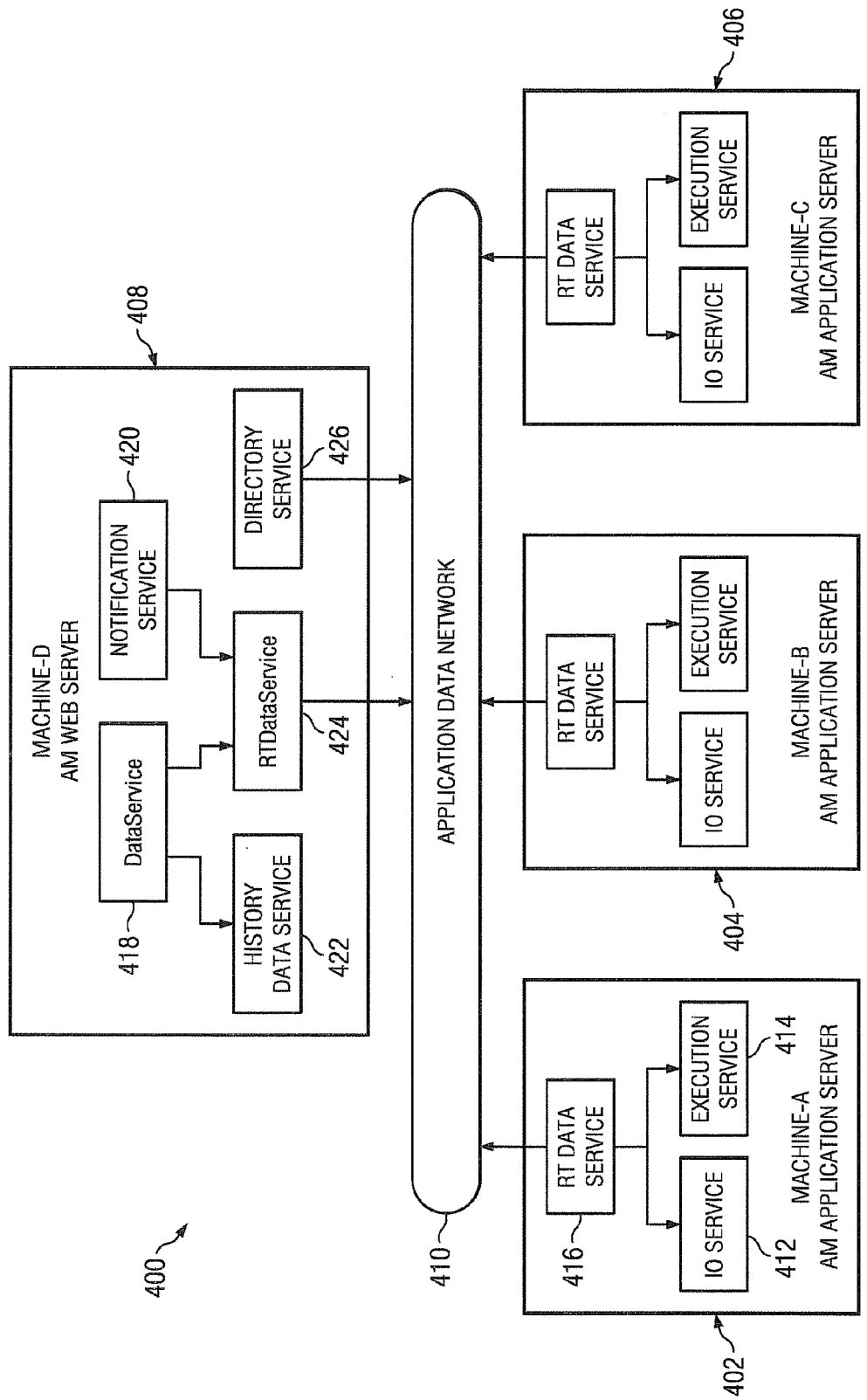
FIG. 4 illustrates an example service-oriented data-driven architecture for a large-scale framework according to this disclosure.

In particular embodiments, the platforms 302-306 can be implemented as services to help simplify integration with other applications. FIG. 4 illustrates an example service-oriented data-driven architecture 400 for the large-scale framework 124 according to this disclosure. In this example, the architecture 400 is implemented in the context of an asset manager (AM) tool, which uses the framework 124 as described below. The architecture 400 could be implemented for any other suitable purpose.

As shown in FIG. 4, the architecture 400 includes application servers 402-406 that communicate and interact with a web server 408 over a network 410. Each application server 402-406 supports an IO service 412, an execution service 414, and a real-time (RT) data service 416. The web server 408 supports a data service 418, a notification service 420, a historical data service 422, a real-time data service 424, and a directory service 426.

The IO services 412 in the application servers 402-406 can support the functions of the IO platform 302. The execution services 414 in the application servers 402-406 can support the functions of the execution platform 304. The notification service 420 in the web server 408 can support the functions of the notification platform 306. The real-time data services 416 in the application servers 402-406 and the real-time data service 424 in the web server 408 can manage the data cache 322 by providing a Windows Communication Foundation (WCF) real-time data service. The data service 418 in the web server 408 supports the use of both real-time and historical data, while the directory service 426 supports the use of web services in the architecture 400.

The architecture 400 here supports loose coupling to enable service orchestration and distributed processing. Once again, operations can be data-driven, and distributed processing can be established by configuring the directory service 426 (which maintains lists of registered data services). For a subscription of data, a local data service 416, 424 is contacted, which in turn creates a publisher-subscriber relationship with other data services 416, 424 when the data is not owned by the local service. This way, data can be accessed in a transparent manner, regardless of its location. The architecture 400 further supports centralized monitoring of different location assets to leverage expertise available in a corporate office. In particular embodiments, the architecture 400 supports a Service Oriented Architecture (SOA).

Although FIGS. 3 and 4 illustrate examples of a data-driven architecture 300 and a service-oriented data-driven architecture 400 for the large-scale framework 124, various changes may be made to FIGS. 3 and 4. For example, the architecture 300 could include any number of platforms 302-308 (each with any number of data streams, servers, or other components) and data caches 322. Also, the architecture 400 could include any other or additional services to support the framework 124.

Figure 5:
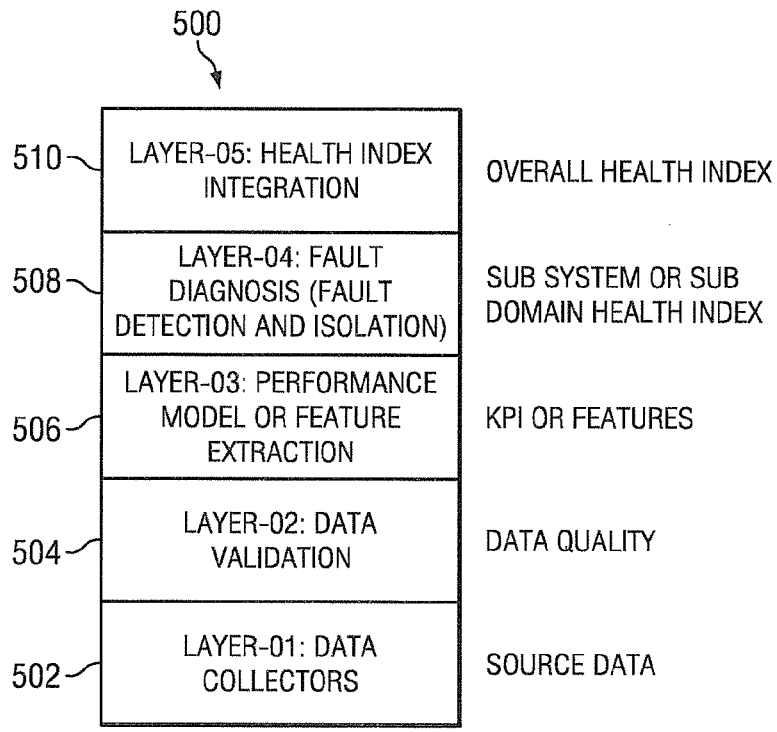
FIG. 5 illustrates an example layered model for a large-scale framework according to this disclosure.

FIG. 5 illustrates an example layered model 500 for the large-scale framework 124 according to this disclosure. The layered model 500 illustrates how the framework 124 can be used as part of an asset manager to collect data and identify problems with rotating equipment or other equipment in an industrial facility. In this document, the term "asset" and its derivatives refer to equipment, applications, data, framework components, or other entities of an industrial facility or its control system.

As shown in FIG. 5, the layered model 500 includes a data collector layer 502 and a data validation layer 504. The data collector layer 502 defines the sources of data in the framework 124, such as vibration sensors or other data collectors. The data validation layer 504 validates any collected data to ensure suitable data quality. This function could be performed by any device receiving the data from the sensors or other collectors or by the collectors themselves.

The layered model 500 also includes a performance model or feature extraction layer 506. This layer 506 extracts useful data, such as key process indicators or other features, from the collected and validated data. The layer 506 could support various functions to extract useful information from the collected data. For example, the layer 506 could perform fast Fourier transform (FFT) or other signal processing techniques, which could be used to extract useful information from vibration data associated with rotating equipment.

The layered model 500 further includes a fault diagnosis layer 508 and a health index integration layer 510. The fault diagnosis layer 508 uses the information from the extraction layer 506 to identify potential faults in components of industrial equipment. For example, the fault diagnosis layer 508 can use vibration information from the extraction layer 506 to identify whether different components (subsystem or subdomain) of rotating equipment are suffering from faults. The health index integration layer 510 combines faults from the layer 508 to provide an overall health index for a piece of industrial equipment.

The layered model 500 allows facility operators to plug standard or custom components into each layer of the framework 124, such as by using appropriate model building tools. This supports the seamless attachment and detachment of the model 500 to and from an asset at any level of a process control system and can reduce the need to create a custom model for each instance of an asset. Also, the layered model 500 supports distributed processing across multiple machines or networks and enables hierarchical modeling, with each layer 502-510 having suitable models (such as to enable fault or health monitoring on plant, unit, equipment, and sub-equipment levels to determine the health of an asset). In addition, the layered model 500 supports a calculation and logic execution environment. This environment could include pre-built model libraries supporting standard functions (like equipment performance calculations, instrument diagnostic parameter and limit checks, and vibration analytics modeling). Custom model libraries can be added to support additional functionality.

Figure 6:
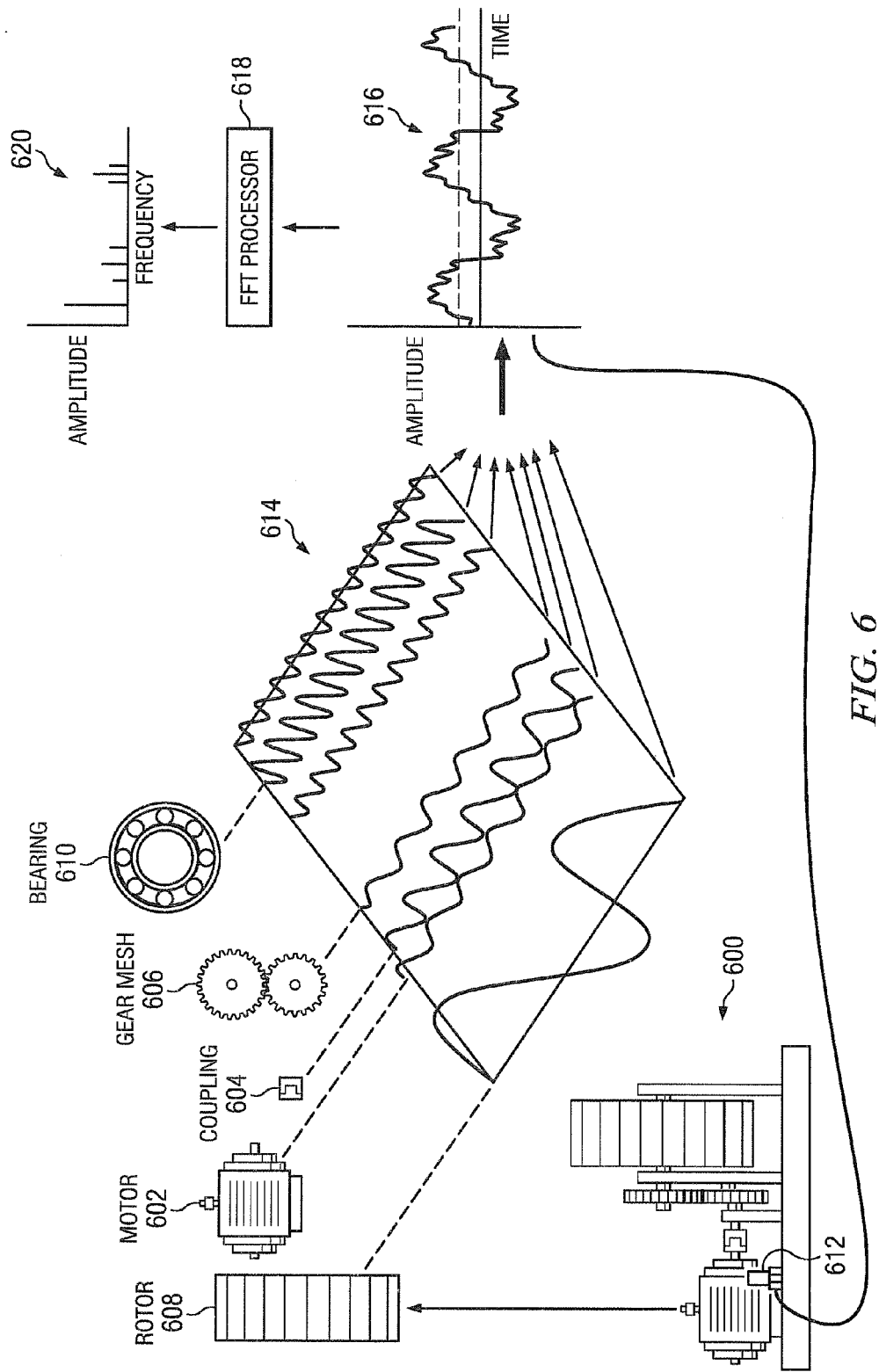
FIGS. 6 and 7 illustrate example uses of a large-scale framework with rotating equipment according to this disclosure.
Figure 7:
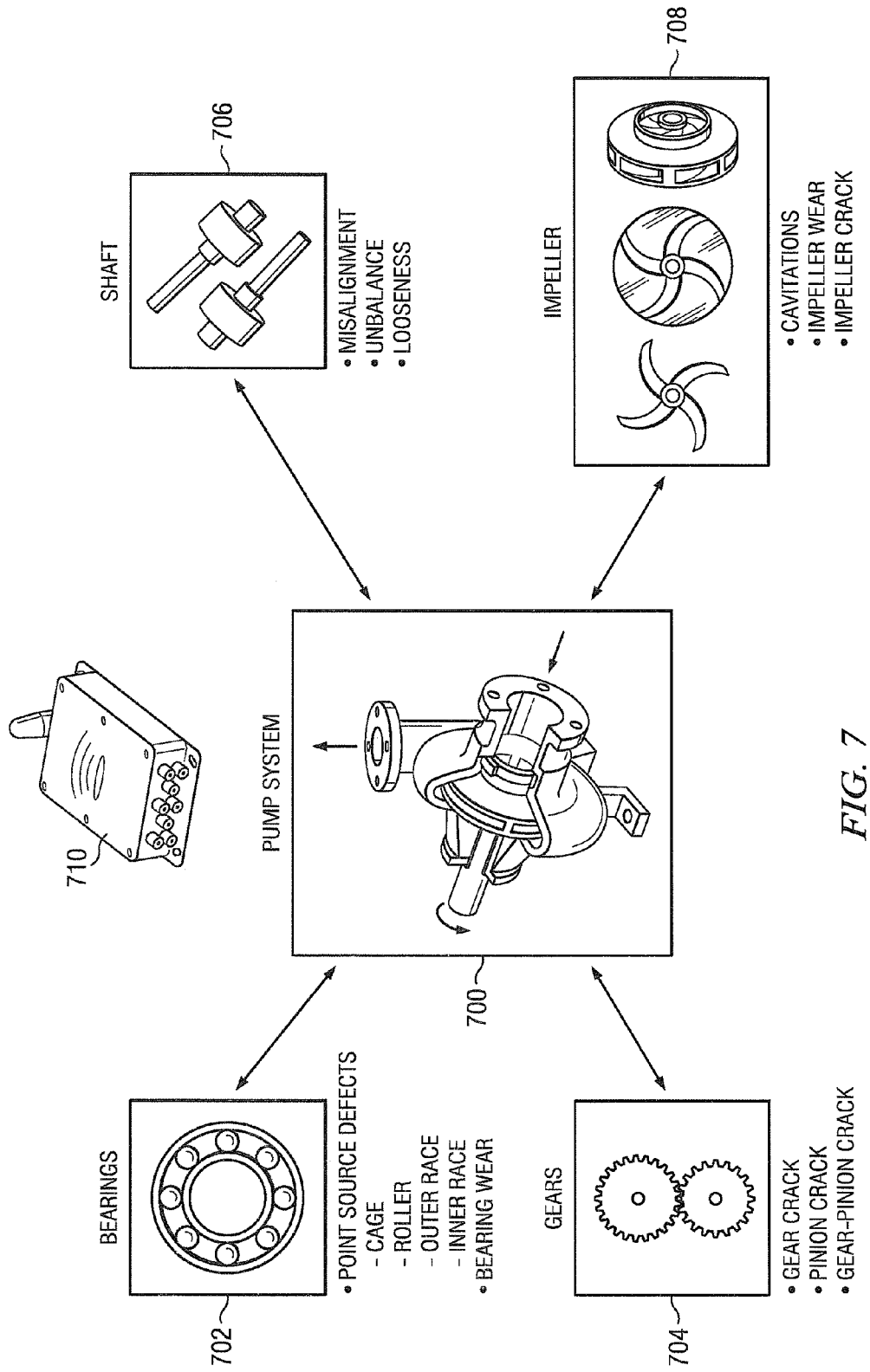

Examples uses of the framework 124 using the layered model 500 are shown in FIGS. 6 and 7. FIG. 6 illustrates an example use of the framework 124 with a piece of rotating equipment 600 according to this disclosure. As shown in FIG. 6, the equipment 600 includes a motor 602 attached to a coupling 604, which couples rotation of the motor 602 to a gear mesh 606. The gear mesh 606 turns a rotor 608, which moves using a set of bearings 610. A vibration sensor 612 can measure vibrations for the entire piece of equipment 600.

Each component 602-610 of the equipment 600 produces its own vibration signals 614, which combine to form the overall time-domain vibration measurements 616 of the equipment 600. Each value in the vibration measurements 616 could be relatively small, such as two bytes. The vibration measurements 616 can undergo FFT or other signal processing 618 to produce a vibration spectrum 620. The vibration spectrum 620 could be represented using a relatively small amount of data, such as 4 kB. Each component 602-610 in the equipment 600 can generate its own vibration "signature" within the spectrum 620.

Here, the layers 502-504 can collect and validate the data from the sensor 612. The layer 506 can perform the processing 618, the layer 508 can use the spectrum 620 to identify faults with individual components 602-610 of the equipment 600, and the layer 510 can use the faults to identify an overall health index of the equipment 600.

FIG. 7 illustrates another example use of the framework 124 with a piece of rotating equipment 700 according to this disclosure. In this example, the equipment 700 represents a pump system that includes bearings 702, gears 704, a shaft 706, and an impeller 708. Here, the layer 506 can perform processing to analyze data associated with these components 702-708, such as by analyzing vibration data. The layer 508 can use the analysis results to identify faults with individual components 702-708 of the equipment 700, and the layer 510 can use the faults to identify an overall health index of the equipment 700.

In some embodiments, various processing steps related to fault detection can occur within a wireless preprocessing sensor 710. The sensor 710 can collect vibration measurements or other sensor readings for equipment and then process the sensor readings to identify one or more characteristics of the equipment. The sensor 710 could then transmit the identified characteristics (with or without the actual sensor measurements). The sensor 710 could, for example, represent a wireless preprocessing sensor disclosed in U.S. Patent Publication No. 2009/0045940 (which is incorporated by reference). One example of this type of sensor is a HONEYWELL ONEWIRELESS EHM device.

In particular embodiments, the layer 508 can support the techniques disclosed in U.S. Patent Publication No. 2010/0030492 to identify faults with bearings, such as cage, roller, outer race, and inner race defects and bearing wear. The layer 508 can support the techniques disclosed in U.S. Patent Publication No. 2010/0256932 to identify faults with gears, such as gear cracks, pinion cracks, and gear/pinion wear. The layer 508 can identify faults with shafts, such as misalignment, unbalance, or looseness. The layer 508 can support the techniques disclosed in U.S. Patent Publication No. 2010/0256953 to identify faults with impellers, such as cavitations, impeller wear, and impeller cracks. These different faults can be detected using the techniques disclosed in U.S. patent application Ser. No. 12/797,472, which supports the detection of faults in multiple subsystems even with overlapping vibration characteristics. All of these patent applications/publications are hereby incorporated by reference.

The framework 124 allows systems like the ones shown in FIGS. 6 and 7 to collect data from a wide variety of sources and process the data efficiently. The health indicators and other data can then be provided to an operator timely or used in any other suitable manner.

Although FIG. 5 illustrates one example of a layered model 500 for the large-scale framework 124, various changes may be made to FIG. 5. For example, the model 500 here is used to support analysis of vibration or other data related to rotating equipment. Other analyses and/or equipment may be associated with other layered models. Although FIGS. 6 and 7 illustrate example uses of the framework 124, the framework 124 could be used in any other suitable manner.

Figure 8:
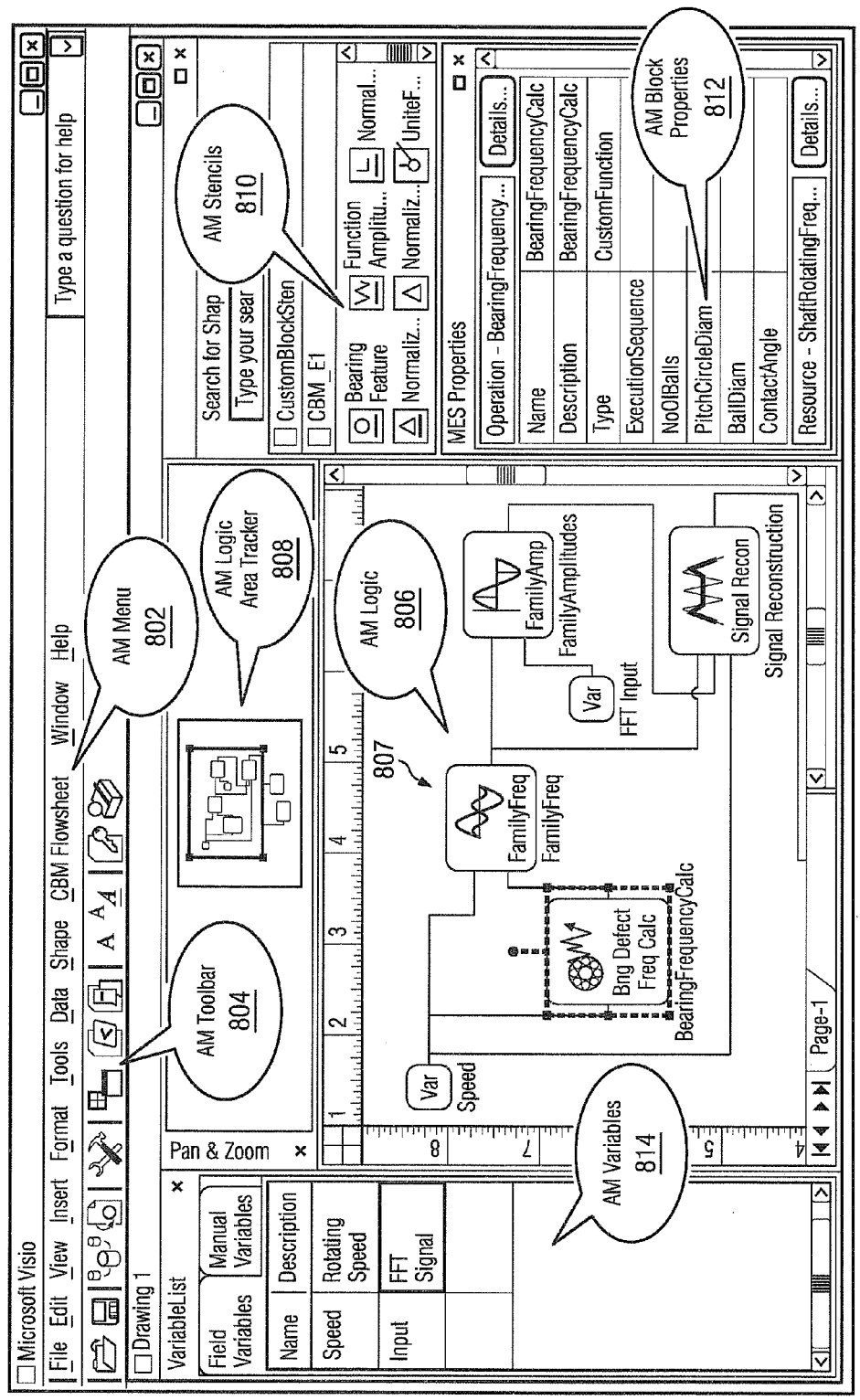
FIG. 8 illustrates an example logic builder for building models at various levels of a large-scale framework according to this disclosure.

FIG. 8 illustrates an example logic builder 800 for building models at various levels 502-510 of the large-scale framework 124 according to this disclosure. In this example, the logic builder 800 is a VISIO-based tool used to define models at any level of the layered model 500. The logic builder 800 includes a menu 802 and a toolbar 804, which are used to invoke different functions of the logic builder 800. A logic definition area 806 is used to insert different functional blocks 807 into a model being defined, and a logic area tracker 808 is used when the logic being defined does not fit entirely within the area 806.

A model is defined in the logic definition area 806 using the functional blocks 807, which can define input and outputs of a model and calculations performed within the model. The functional blocks 807 can be selected from one or more stencils 810, which identify predefined functional blocks. The functional blocks 807 could include blocks that execute particular mathematical calculations, define frequencies of interest, and reconstruct signals. A block properties area 812 identifies the properties for a particular functional block 807 selected in the logic definition area 806. A user can place functional blocks 807 within the logic definition area 806 and connect them, and the user can set certain properties of the functional blocks 807 within the properties area 812.

A variable list area 814 identifies the variables associated with the model being defined. For example, the variable list area 814 can identify the input variables for receiving data into the model and the output variables for providing data from the model. Again, the user can define the variables and their characteristics using the logic builder 800. In this particular example, the user is defining the logic used to collect a spectrum of vibration characteristics associated with rotating equipment and identify any problems with the rotating equipment.

Use of the logic builder 800 can result in higher productivity as it lowers the costs for building and maintaining the logic used in the models. It can also result in improved performance as the logic structures can be parsed and executed quickly. The use of the logic builder 800 can help to standardize maintenance practices, allow customers to insert expertise into solutions seamlessly, and integrate with manual data entry in the field. In addition, the logic builder 800 can provide support for nested models, which can be resolved recursively and evaluated at each instance level. Note that when a model is defined using the logic builder 800, the equation analyzer (like the functional unit 206b) can use information from the logic builder 800 to identify relationships between its input and output variables.

Although FIG. 8 illustrates one example of a logic builder 800 for building models at various levels 502-510 of the large-scale framework 124, various changes may be made to FIG. 8. For example, the logic builder 800 could have any other layout and any other or additional content. Also, any other suitable builder could be used to define models for the framework 124.

FIGS. 9 through 19 illustrate details of an example asset manager that uses the large-scale framework 124 according to this disclosure. In general, an asset manager 900 can be used by facility personnel to support reliability efforts, which can lead to improved equipment uptimes and help keep product production at planned levels.

Figure 9:
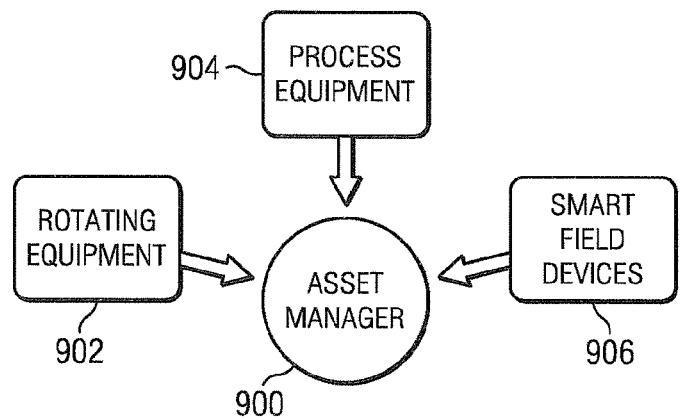

FIG. 9 illustrates an example use of the asset manager 900. In this example, the asset manager 900 receives data associated with rotating equipment 902, process equipment 904, and smart field devices 906. The asset manager 900 monitors the performance of the rotating equipment 902 and the process equipment 904, such as by receiving data from wired or wireless sensors and processing the data to identify fault conditions and health index values. The asset manager 900 can also incorporate observations from off-line or external sources and support the execution of equipment vendor applications or other third-party applications. In some embodiments, the asset manager 900 can receive data identifying possible faults of rotating equipment 902 from preprocessing sensors as described above. The performance and status of the rotating equipment 902 and the process equipment 904 can be presented on an operator station 116.

The smart field devices 906 represent field devices having some form of intelligence, such as HART and FOUNDATION FIELDBUS transmitters and positioners. These field devices 906 typically report a wide variety of status or diagnostic events, which can relate to the health of associated processing equipment. The asset manager 900 uses this data to identify status and diagnostic events and associate health information with the processing equipment.

By doing this, the asset manager 900 integrates information from equipment in a processing facility and performs analyses using that information. The asset manager 900 also assesses abnormal conditions of the processing equipment and monitors the performance of the processing equipment. This supports collaboration among a number of different personnel and tools of the processing facility.

The asset manager 900 can collect data for monitoring, abnormal condition assessment, and analysis from any suitable sources. The data can include process data, historical data, and alerts from OPC DA, HDA, and A&E servers. The data can also include manual data (like field observations) from SQL servers or vibration spectra from HONEYWELL ONEWIRELESS devices or SKF @PTITUDE ANALYST sources. The data can be collected, processed, and made available in various representations. These representations can include a physical system representation (like one divided by equipment, instruments, servers, etc.), a functional system representation (like one divided by plant, unit, sections, etc.), or a hierarchy. Each entity (plants, units, equipment, instruments, etc.) can be assigned attributes and associated with additional data, such as linked documents, hyperlinks, and external applications.

The analyses performed by the asset manager 900 can include the same types of analyses discussed above, such as data validation, feature extraction, fault diagnosis, and health index integration. Other analyses could include process equipment trending and smart device fault history analysis. Abnormal condition assessment could involve the use of a standard library of fault models, as well as user-configurable models. The models can define the variables used in various calculations and logical algorithms. Visualization techniques can be used to present results of abnormal condition assessment, such as hierarchical and expandable tree maps. The performance monitoring can include comparing current operating performance parameters with expected parameters.

Collaboration is supported since the asset manager 900 is a common tool that can be used by operations, maintenance, and reliability personnel. The asset manager 900 supports repeatable recognition of equipment faults and can rate the severity/criticality of equipment problems. Knowledge for a plant can be established and managed using the asset manager 900 to support equipment assessment based on performance, behavior, and condition indicators. Moreover, information about critical equipment risks can be shared using the asset manager 900. Collaboration can also be supported through the use of notifications, alarms, reports, and data export tools. This collaboration can help to support the rapid recognition of where problems occur. Among other things, this provides operations and maintenance personnel with a common framework for recognizing the effects of equipment conditions on production dependability.

Figure 10:
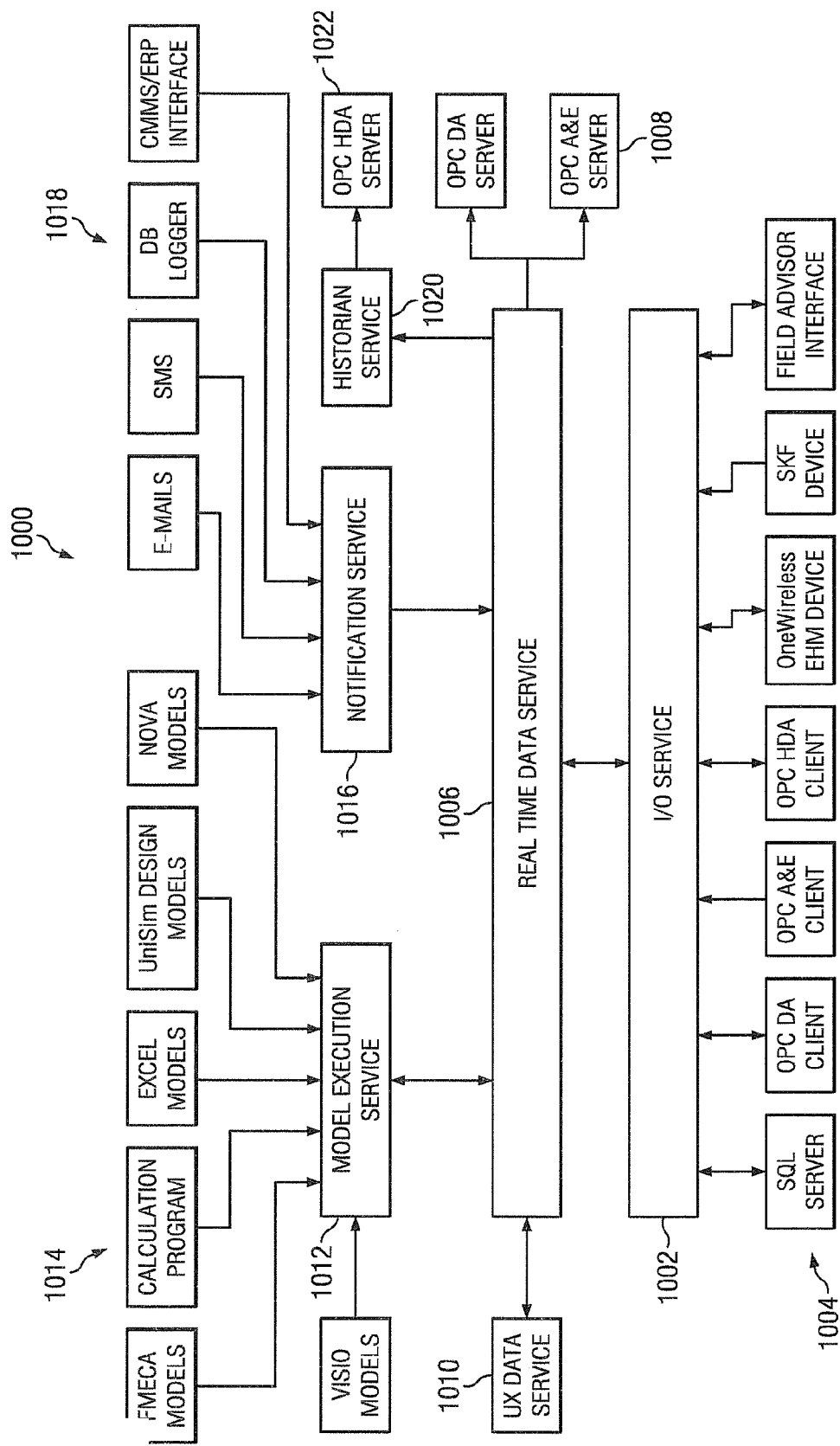

FIG. 10 illustrates an example high-level architecture 1000 for the asset manager 900. In this case, the architecture 1000 includes an I/O service 1002 that can receive data from a number of external sources 1004. A real-time data service 1006 supports the transport of data between various components, including OPC servers 1008 and a Ux data service 1010. A model execution service 1012 uses the data and executes various models 1014, including VISIO models; failure mode, effect, and criticality analysis (FMECA) models; calculation programs; EXCEL models; UNISIM DESIGN models; and HONEYWELL NOVA DAE models. A notification service 1016 supports notifications using communication mechanisms 1018, such as email, SMS, a database (DB) logger, and a computerized maintenance management system/enterprise resource planning (CMMS/ERP) interface. A historian service 1020 provides access to an OPC HDA server 1022. The architecture 1000 may be implemented in a distributed manner in a similar manner as the architecture of FIG. 4.

FIGS. 11 through 19 illustrate an example graphical user interface (GUI) 1100 for the asset manager 900 according to this disclosure. In this example, the GUI 1100 includes a primary function list 1102 identifying different primary operations of the asset manager 900. The primary function list 1102 here includes configuration, monitoring, and analysis functions. A secondary function list 1104 identifies different operations of the asset manager 900 associated with a function selected in the list 1102. An asset selection area 1106 allows a user to select a particular asset for configuration, monitoring, or analysis. A content area 1108 presents different information to the user depending on the other selections in the GUI 1100.

In FIG. 11, a user is attempting to configure characteristics of a shell and tube asset type. The content area 1108 includes a menu 1110 allowing the user to configure different aspects of this asset type. In this case, the user has elected to define variables for the selected asset type, and a table 1112 identifies existing variables and can be used to add, delete, and modify variables.

Figure 12:
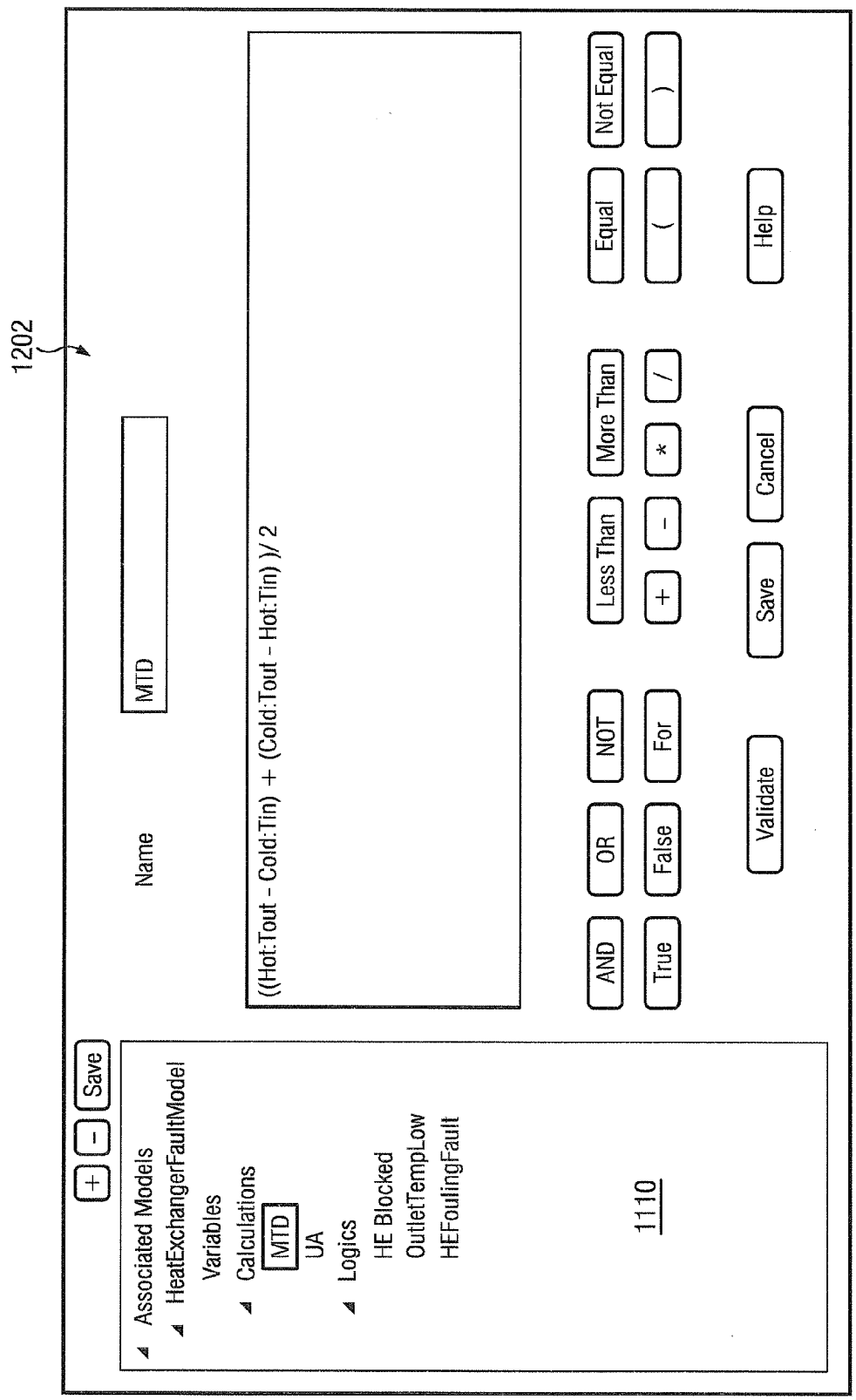
Figure 13:
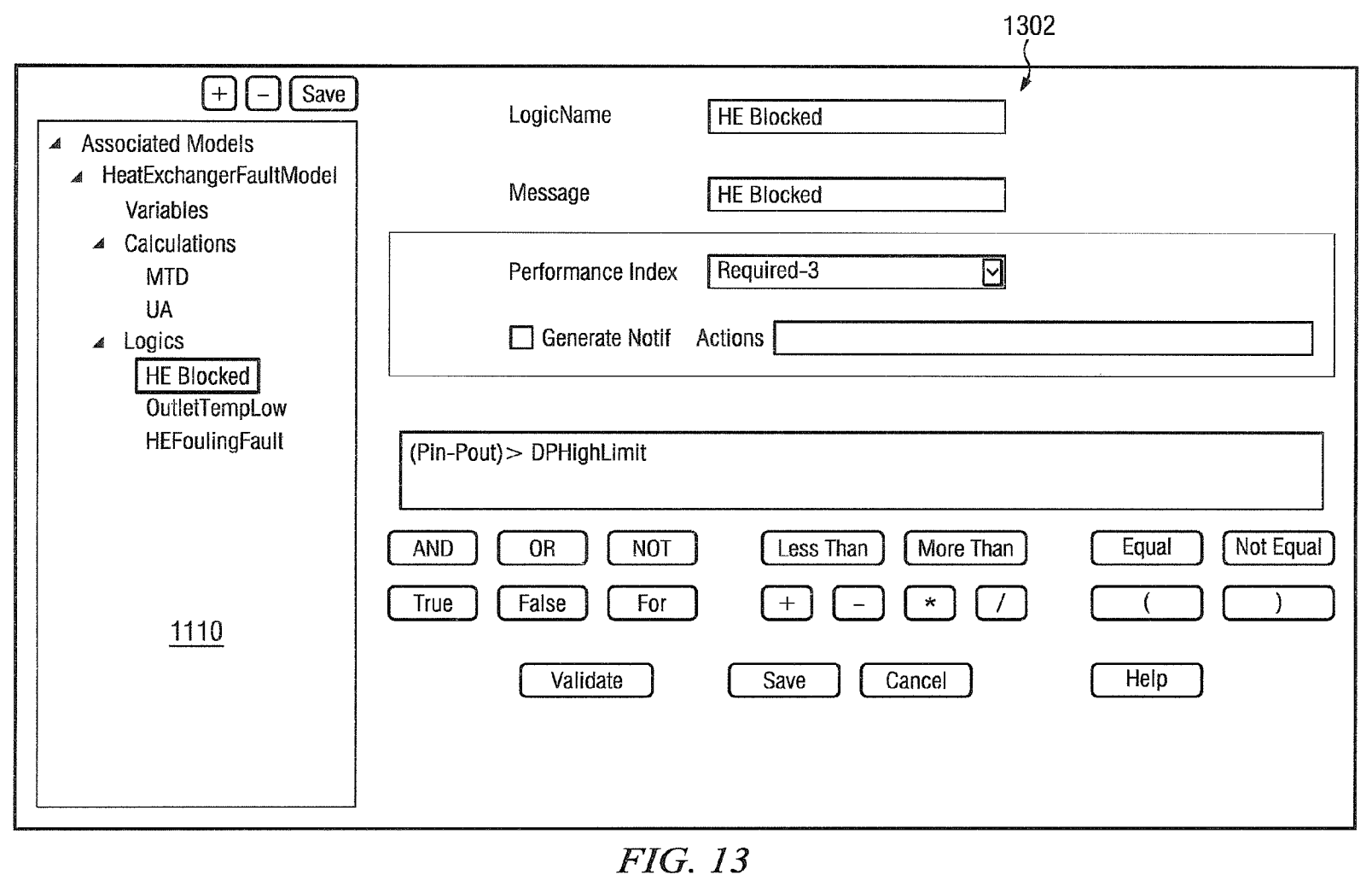

In FIG. 12, the user has elected to define or edit a calculation in the menu 1110, causing a calculation definition area 1202 to be displayed in the content area 1108. The definition area 1202 allows the user to define an equation in a model. Similarly, in FIG. 13, the user has elected to define or edit a logic block in the menu 1110, causing a logic block definition area 1302 to be displayed in the content area 1108. The definition area 1302 allows the user to define an equation in a functional logic block, as well as additional features (such as whether a notification is generated or an action is to be taken).

Figure 14:
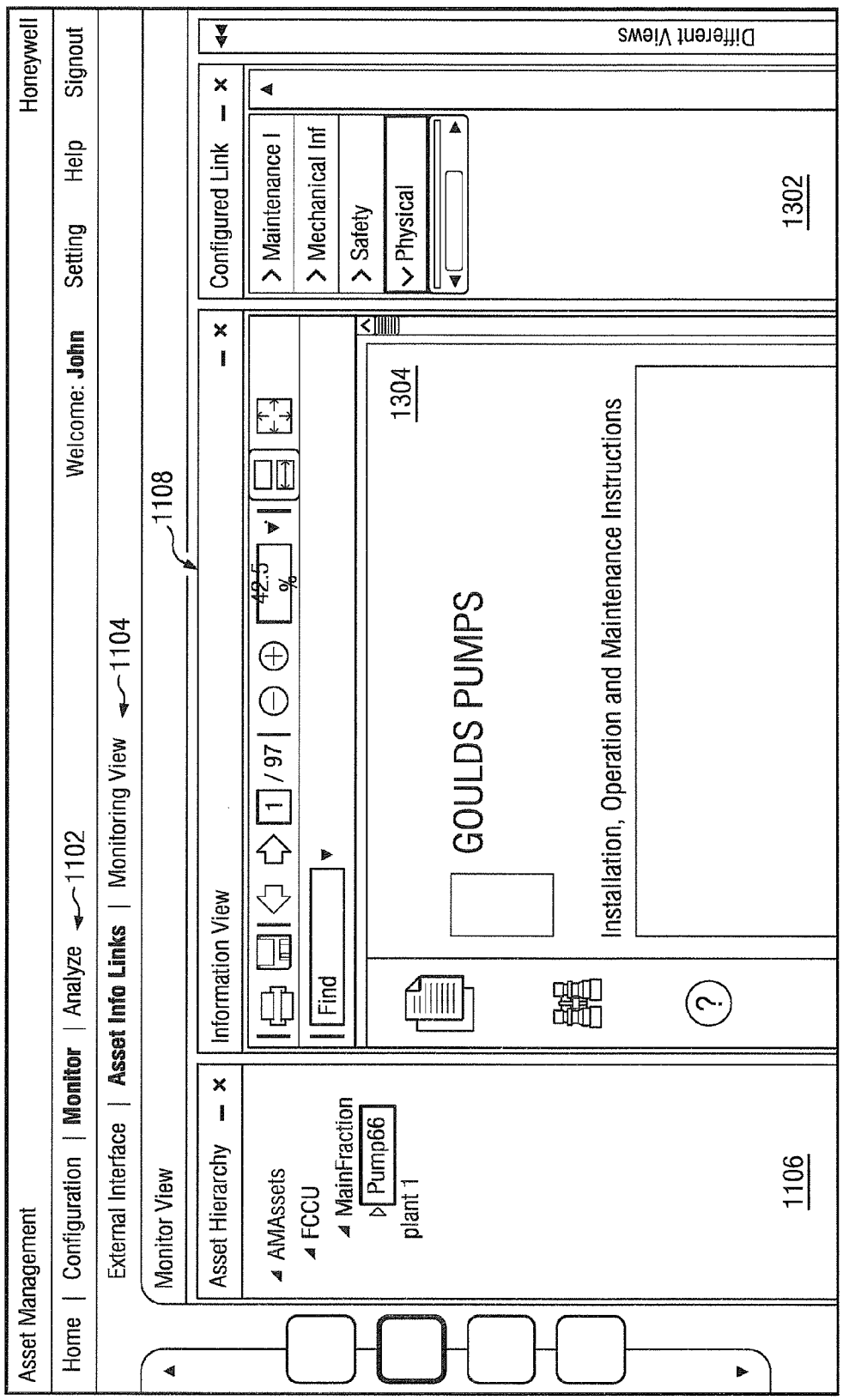

As shown in FIG. 14, the user has selected the monitoring function in the menu 1102 and asset information links in the menu 1104. The user has also selected an asset from the asset selection area 1106. In this case, the GUI 1100 presents in a list 1302 different types of information that can be viewed. The user can select a type of information to be viewed, and asset information is then presented in a display area 1304. Here, the user is viewing a PDF document related to a pump.

Figure 15:
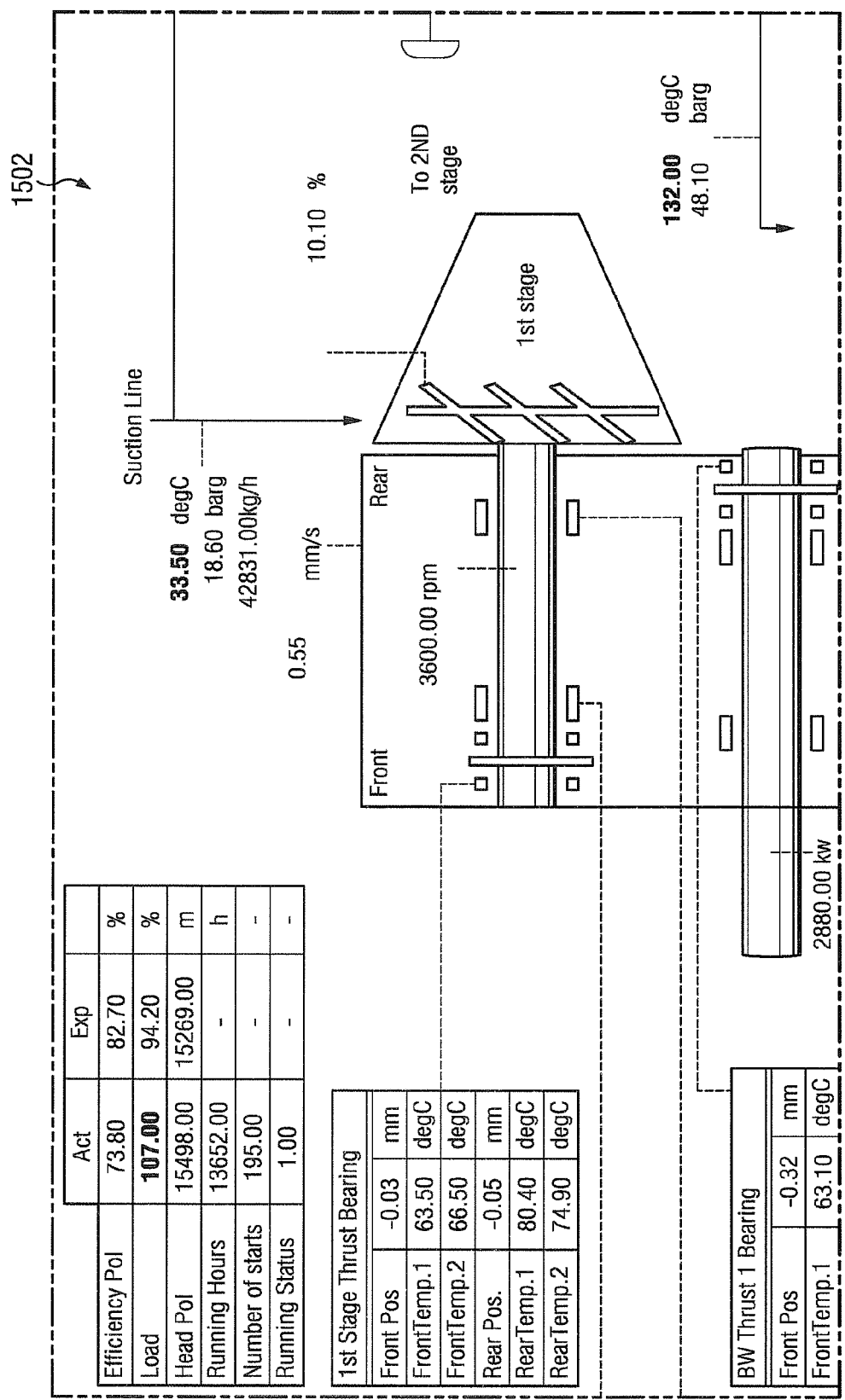

As shown in FIG. 15, if the user selects a monitoring view in the menu 1104, a display 1502 can be presented in the content area 1108. The display 1502 presents various performance monitoring information for a selected asset, such as the values of various variables associated with the selected asset. The display 1502 could also present trend information for a selected variable or any other performance-related data.

Figure 16:
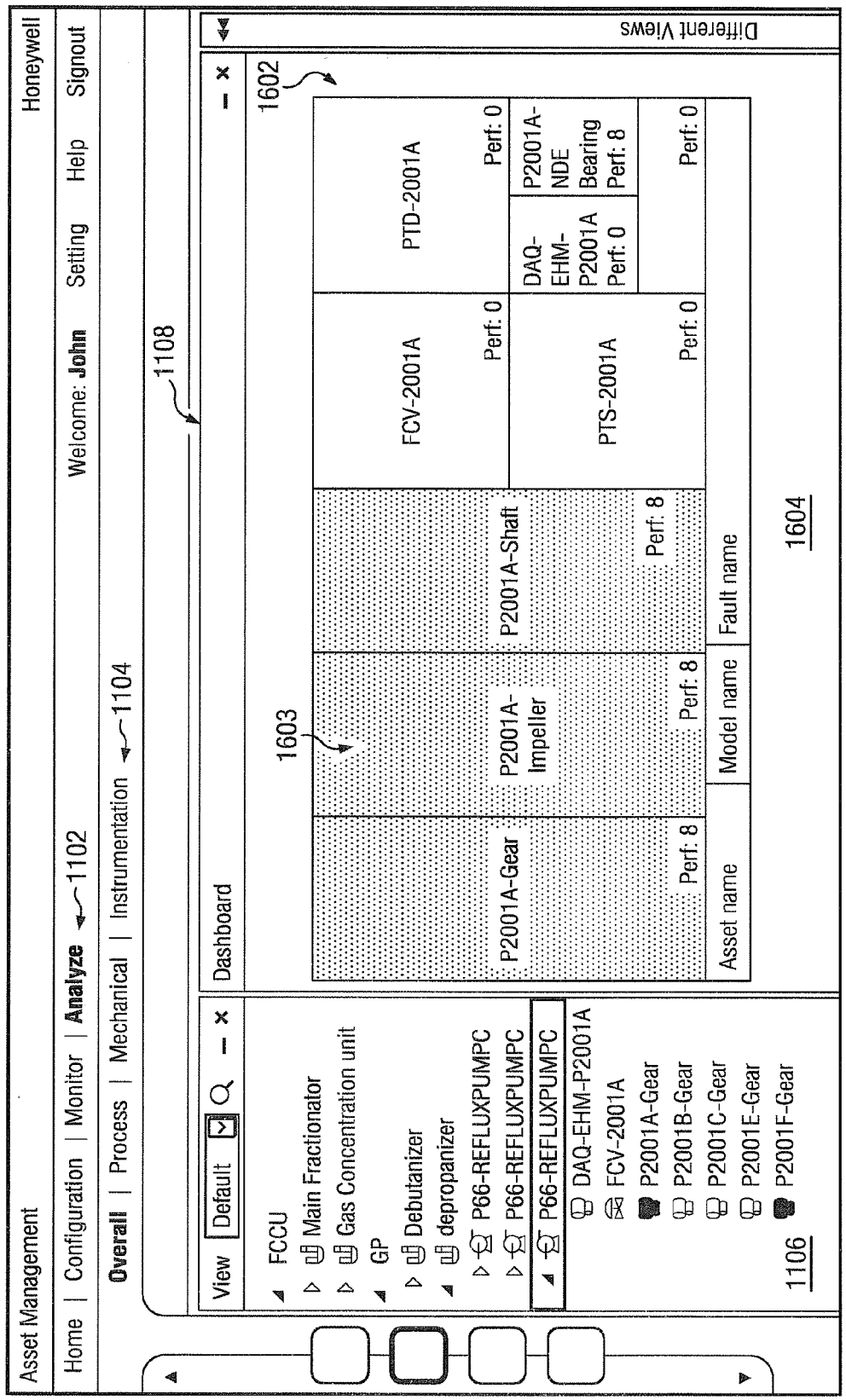

As shown in FIG. 16, the user has selected an analysis function the menu 1102 and an overall/review function in the menu 1104. A dashboard is being presented in the content area 1108 for a selected asset. The dashboard includes a tree map 1602, which identifies a hierarchical and expandable tree structure showing different equipment components associated with the selected asset. Different blocks 1603 in the tree map 1602 represent different components of the selected asset. A size of a block 1603 could denote the relative importance of a component in the selected asset. A color, shading, or other indicator in a block 1603 can denote whether that component or lower-level elements forming that component are reporting an abnormal condition. The tree map 1602 allows a large number of components to be displayed in relation to other components. Other factors like rated criticality or assessed urgency can also be shown for each component.

If one of the blocks 1603 in the tree map 1602 is selected, data for the component associated with the selected block 1603 is shown in a table 1604. The table 1604 can identify an asset/component name, a name of a model associated with the asset/component, and any fault for that asset/component or its sub-elements.

Figure 17:
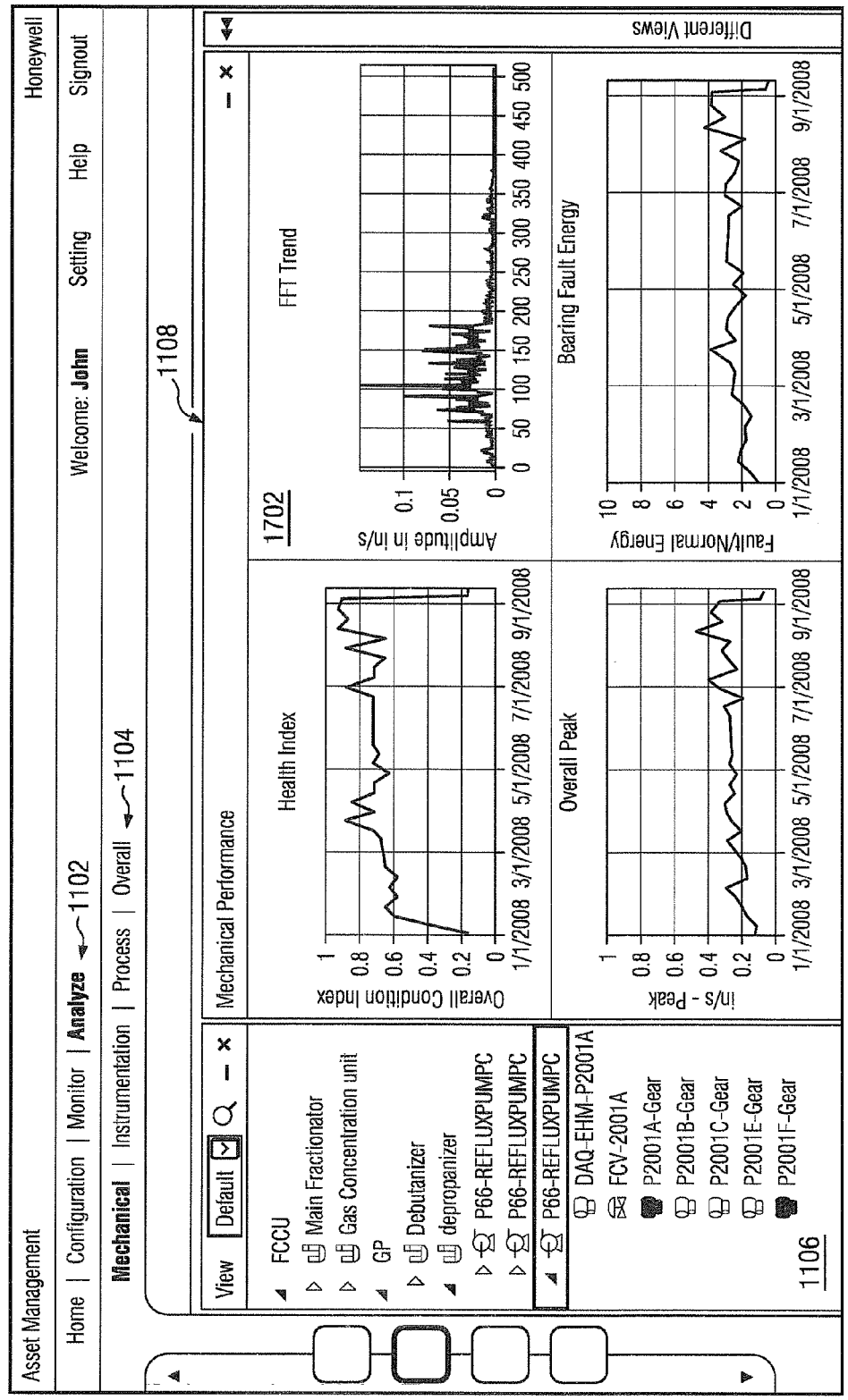

As shown in FIG. 17, the user has selected the analysis function in the menu 1102 and a mechanical analysis function in the menu 1104. Different types of data are shown for a selected asset in various tables 1702. In this example, the tables 1702 identify a health index trend, an FFT trend, an overall peak trend, and a bearing fault energy trend for the selected asset.

Figure 18:
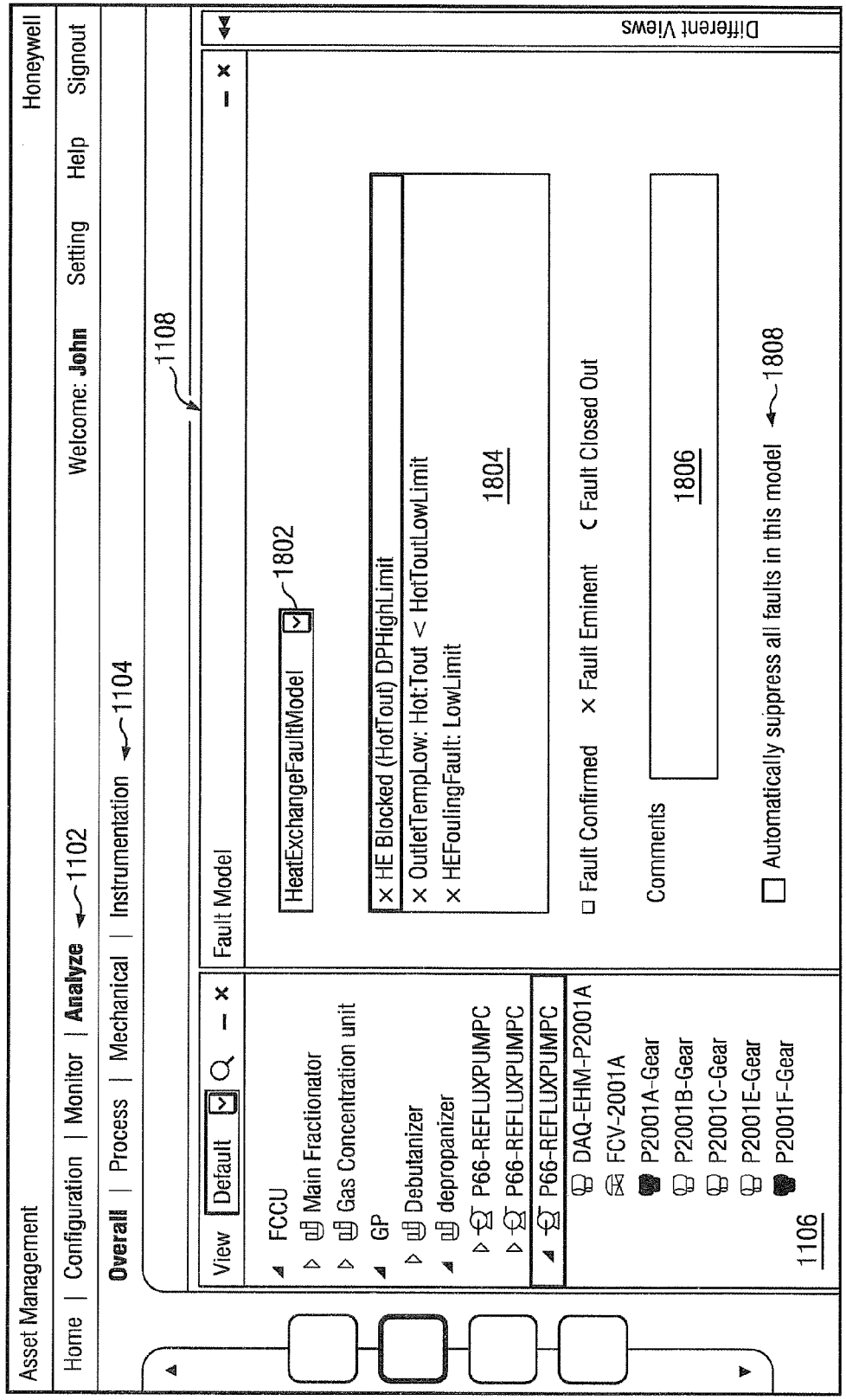

As shown in FIG. 18, the user is viewing the fault model for a selected asset in the content area 1108. The content area 1108 identifies the selected fault model in a drop-down list 1802, and faults for the selected fault model are identified in a list 1804. Each fault in the list 1804 is associated with an icon indicating whether that fault is confirmed, eliminated, or closed. A text box 1806 allows the user to enter comments about the selected fault model, and a checkbox 1808 allows the user to suppress all faults associated with the selected model.

Figure 19:
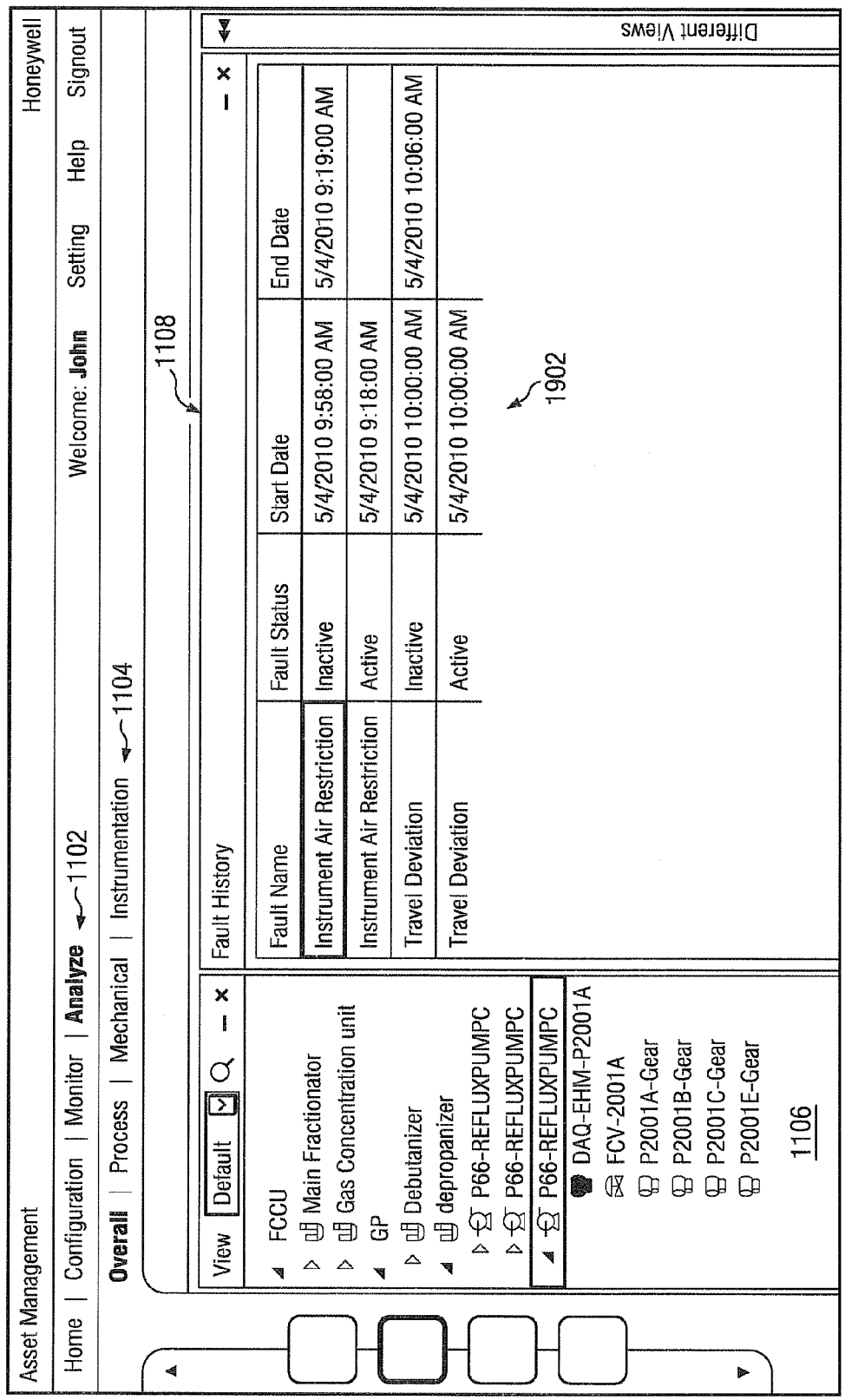

As shown in FIG. 19, the user has selected to review a fault history for a selected asset. In this case, the content area 1108 contains a table 1902 showing the current and previous faults for a selected asset. The table 1902 identifies each fault's name, status, start date, and end date (if any). This allows the user to view the history of faults for a particular asset.

As noted above, the asset manager 900 can use the framework 124 to provide performance monitoring, abnormal condition detection, and other functions related to industrial equipment. The asset manager 900 can be used by different personnel in a facility to enable more effective collaboration.

Although FIGS. 9 through 19 illustrate details of one example of an asset manager 900 that uses the large-scale framework 124, various changes may be made to FIGS. 9 through 19. For example, the asset manager 900 could be used with any other suitable components in FIG. 9 and include any other or additional services in FIG. 10 to support the framework 124. Also, the content and arrangement of information in the GUI 1100 is for illustration only.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
  associating, by at least one processing device, multiple real-time applications with a framework, the multiple real-time applications comprising applications for monitoring or controlling equipment in at least one industrial facility, each application having at least one input variable and at least one output variable that are stored in at least one memory, the framework comprising an execution environment, an input/output (IO) environment, and a data cache;
  using, by the at least one processing device, one or more graphical function blocks in a graphical application to identify relationships between the at least one input variable and the at least one output variable of each application, generate a variable dependency matrix for each application, and combine the variable dependency matrices for the applications to generate a final variable dependency matrix defining a hierarchy of variables, the variable dependency matrices used to identify data dependencies;
  storing in the data cache, by the at least one processing device, data being transported between the execution environment and the IO environment in real-time, wherein the data is stored in an address format defined by a data model configured by a user for the framework; and
  receiving, in the data cache, a change to at least one of the input or output variables, identifying by the at least one processing device at least one of the applications associated with the at least one changed variable based on the data dependencies, and publishing by the at least one processing device the at least one changed variable to the at least one identified application to support data driven operation of the framework;
  wherein the data-driven operation of the framework provides data to the applications to support at least one of: performance monitoring of the equipment, analysis of the equipment's operation, and identification of abnormal equipment conditions,
  wherein the framework further comprises multiple layers, the layers comprising:
    a data collector layer configured to receive the at least one changed variable from data sources;
    a data validation layer configured to validate the received at least one changed variable;
    an extraction layer configured to identify key process indicators associated with the equipment using the at least one changed variable;
    a fault diagnosis layer configured to identify faults associated with sub-components of the equipment; and
    a health index integration layer configured to identify health index values for the equipment using the identified faults.

2. The method of claim 1, wherein the data-driven operation of the framework maintains multiple sequences of operations in the applications, the sequences of operations performed using the provided data.

3. The method of claim 1, wherein the applications comprise both native applications embedded within the execution environment and custom applications added to the execution environment.

4. The method of claim 1, further comprising: executing an asset manager that uses the layers of the framework to monitor operation of the equipment, the asset manager configured to monitor the operation of the equipment by receiving real-time field data from one or more sensors associated with the equipment and processing the real-time field data to identify one or more fault conditions of the equipment.

5. The method of claim 4, further comprising: providing a graphical user interface (GUI) for the asset manager, the GUI identifying the equipment and statuses of the equipment.

6. The method of claim 5, wherein the GUI comprises:
  a tree map comprising multiple blocks, each block associated with a piece of equipment; and an indicator of each block identifying the status of the associated piece of equipment and the equipment's sub-components.

7. The method of claim 1, wherein: the equipment comprises a piece of equipment having a rotating component; the at least one changed variable comprises vibration data; and the key process indicators comprise a frequency spectrum associated with the vibration data.

8. The method of claim 1, further comprising: propagating a data quality of a plurality of input variables through the hierarchy of variables, at least one of the input variables associated with a suction pressure or vapor pressure of a pump in the at least one industrial facility.

9. The method of claim 1, wherein the IO environment comprises multiple separate data streams managed by a thread pool, the data streams comprising a first data stream for real-time field data and a second data stream for historical data.

10. The method of claim 9, wherein: receiving the change to the at least one of the input or output variables comprises receiving the at least one changed variable in one or more of the data streams; and notifying the at least one identified application comprises using a real-time data service.

11. A non-transitory computer readable medium encoded with a computer program, the computer program comprising:
   computer readable program code for causing at least one processing device to use one or more graphical function blocks in a graphical application to identify relationships between input variables and output variables of multiple real-time applications associated with a framework, generate a variable dependency matrix for each application, and combine the variable dependency matrices for the applications to generate a final variable dependency matrix defining a hierarchy of variables, the variable dependency matrices used to identify data dependencies, the applications comprising applications for monitoring or controlling equipment in at least one industrial facility, each application having at least one input variable and at least one output variable that are stored in at least one memory, the framework comprising an execution environment, an input/output (IO) environment, and a data cache;
   computer readable program code for storing, in the data cache, data being transported between the execution environment and the IO environment in real-time, wherein the data is stored in an address format defined by a data model configured by a user for the framework; and
   computer readable program code for causing the at least one processing device, after the data cache has received a change to at least one of the input or output variables, to identify at least one of the applications associated with the at least one changed variable based on the data dependencies and publish the at least one changed variable to the at least one identified application to support data driven operation of the framework;
   wherein the data-driven operation of the framework is configured to provide data to the applications to support at least one of: performance monitoring of the equipment, analysis of the equipment's operation, and identification of abnormal equipment conditions,
   wherein the framework further comprises multiple layers, the layers comprising:
      a data collector layer configured to receive the at least one changed variable from data sources;
      a data validation layer configured to validate the received at least one changed variable;
      an extraction layer configured to identify key process indicators associated with the equipment using the at least one changed variable;
      a fault diagnosis layer configured to identify faults associated with sub-components of the equipment; and
      a health index integration layer configured to identify health index values for the equipment using the identified faults.

12. The non-transitory computer readable medium of claim 11, wherein the framework is configured to maintain multiple sequences of operations in the applications, the sequences of operations performed using the provided data.

13. The non-transitory computer readable medium of claim 11, wherein the applications comprise both native applications embedded within the execution environment and custom applications added to the execution environment; and further comprising computer readable program code for causing the at least one processing device to support a real-time data service between the native and custom applications.

14. The non-transitory computer readable medium of claim 11, further comprising: computer readable program code implementing an asset manager that is configured to use the layers of the framework to monitor operation of the equipment, the asset manager configured to monitor the operation of the equipment by receiving real-time field data from one or more sensors associated with the equipment and processing the real-time field data to identify one or more fault conditions of the equipment.

15. The non-transitory computer readable medium of claim 14, further comprising: computer readable program code for causing the at least one processing device to provide a graphical user interface (GUI) for the asset manager, the GUI identifying the equipment and statuses of the equipment; wherein the GUI comprises a tree map comprising multiple blocks, each block associated with a piece of equipment, an indicator of each block identifying the status of the associated piece of equipment and the equipment's sub-components.

16. A system comprising:
   at least one interface configured to receive data associated with equipment in at least one industrial facility; and
   at least one processing device configured to:
      use one or more graphical function blocks in a graphical application to identify relationships between input variables and output variables of multiple real-time applications associated with a framework, generate a variable dependency matrix for each application, and combine the variable dependency matrices for the applications to generate a final variable dependency matrix defining a hierarchy of variables, the variable dependency matrices used to identify data dependencies, the real-time applications comprising applications for monitoring or controlling the equipment, each application having at least one input variable and at least one output variable that are stored in at least one memory, the framework comprising an execution environment, an input/output (IO) environment, and a data cache;
      store, in the data cache, data being transported between the execution environment and the IO environment in real-time, wherein the data is stored in an address format defined by a data model configured by a user for the framework; and
      after the data cache has received a change to at least one of the input or output variables, identify at least one of the applications associated with the at least one changed variable based on the data dependencies and publish the at least one changed variable to the at least one identified application to support data driven operation of the framework;
      wherein the data-driven operation of the framework is configured to provide the data to the applications to support at least one of: performance monitoring of the equipment, analysis of the equipment's operation, and identification of abnormal equipment conditions, wherein the framework further comprises multiple layers, the layers comprising:
- a data collector layer configured to receive the at least one changed variable from data sources;
- a data validation layer configured to validate the received at least one changed variable;
- an extraction layer configured to identify key process indicators associated with the equipment using the at least one changed variable;
- a fault diagnosis layer configured to identify faults associated with sub-components of the equipment; and
- a health index integration layer configured to identify health index values for the equipment using the identified faults.

17. The system of claim 16, wherein the at least one processing device comprises multiple processing devices configured to execute the framework in a distributed manner.

18. The system of claim 17, wherein the processing devices are configured to execute real-time data services to enable data access in a transparent manner.

* * * * *